United States Patent
Poisel

(10) Patent No.: US 8,884,820 B2
(45) Date of Patent: Nov. 11, 2014

(54) RECEIVING STATION AND METHODS FOR DETERMINING AN ANGLE-OF-ARRIVAL OF SHORT-DURATION SIGNALS USING SURFACE-ACOUSTIC-WAVE (SAW) DEVICES

(75) Inventor: Richard A. Poisel, Vail, AZ (US)

(73) Assignee: Raytheon Company, Waltham, MA (US)

( * ) Notice: Subject to any disclaimer, the term of this patent is extended or adjusted under 35 U.S.C. 154(b) by 403 days.

(21) Appl. No.: 12/820,697

(22) Filed: Jun. 22, 2010

(65) Prior Publication Data

US 2011/0309982 A1 Dec. 22, 2011

(51) Int. Cl.
G01S 3/46 (2006.01)
G01S 5/04 (2006.01)
G01S 5/12 (2006.01)
G01S 5/02 (2010.01)

(52) U.S. Cl.
CPC *G01S 5/0221* (2013.01); *G01S 5/04* (2013.01)
USPC .......................... 342/378; 342/387; 342/465

(58) Field of Classification Search
USPC ................ 342/387, 434–435, 463, 437, 378; 359/312, 311; 333/138, 193
IPC ....................................................... H03H 9/42
See application file for complete search history.

(56) References Cited

U.S. PATENT DOCUMENTS

| | | | | |
|---|---|---|---|---|
| 4,037,174 A | * | 7/1977 | Moore et al. .................. | 333/193 |
| 4,326,778 A | * | 4/1982 | Berg et al. ..................... | 359/306 |
| 4,888,593 A | * | 12/1989 | Friedman et al. ............. | 342/387 |
| 5,373,260 A | | 12/1994 | Kato | |
| 5,696,628 A | * | 12/1997 | Sutton et al. .................. | 359/566 |
| 5,943,014 A | * | 8/1999 | Gilhousen ..................... | 342/465 |
| 6,104,344 A | * | 8/2000 | Wax et al. ..................... | 342/378 |
| 6,275,189 B1 | | 8/2001 | Rubin | |
| 6,285,493 B1 | * | 9/2001 | Carrott et al. ................. | 359/311 |
| 6,639,552 B2 | * | 10/2003 | Carrott .......................... | 342/387 |

(Continued)

FOREIGN PATENT DOCUMENTS

WO WO-2011/162808 A1 12/2011

OTHER PUBLICATIONS

R. W. Ralston et al., A New Signal-Processing Device, The Integrating Correlator, Ultrasonics Symposium Proceedings, p. 623-628, 1977.*

(Continued)

*Primary Examiner* — Gregory C Issing
*Assistant Examiner* — Fred H Mull
(74) *Attorney, Agent, or Firm* — Schwegman Lundberg & Woessner, P.A.

(57) ABSTRACT

Embodiments of a system and method for determining an angle-of-arrival (AOA) of signals received from a transmitting device are shown. Signals from the transmitting device are received through two or more pairs of spatially-diverse antennas. A non-inverted version of the signals received through a first antenna of a pair is injected into a first input of a surface-acoustic-wave (SAW) device. An inverted version of the signals received through a second antenna of the pair is injected into a second input of the SAW device. Signals present at tap outputs are processed to determine a time-difference-of-arrival (TDOA) between the signals received through each pair of antennas. The AOA may be calculated from the TDOAs determined from two or more pairs of antennas.

13 Claims, 11 Drawing Sheets

(56) References Cited

U.S. PATENT DOCUMENTS

| | | | | |
|---|---|---|---|---|
| 7,515,506 | B2* | 4/2009 | Szajnowski | 367/127 |
| 7,538,929 | B2* | 5/2009 | Wasilousky | 359/285 |
| 2006/0223587 | A1 | 10/2006 | Fernandez-Corbaton et al. | |
| 2006/0280032 | A1 | 12/2006 | Szajnowski | |
| 2010/0321239 | A1* | 12/2010 | Rossi et al. | 342/387 |

OTHER PUBLICATIONS

D.L. Smythe et al., A SAW/CCD accumulating correlator, Applied Physics Letters, vol. 34, p. 620-622, 1979.*

Surface acoustic wave (SAW). (2001). In Hargrave's communications dictionary, Wiley. Retrieved from http://search.credoreference.com/content/entry/hargravecomms/surface_acoustic_wave_saw/0.*

Surface acoustic wave devices (SAW devices). (2009). In The Penguin dictionary of physics. Retrieved from http://search.credoreference.com/content/entry/pendphys/surface_acoustic_wave_devices_saw_devices/0.*

"International Application Serial No. PCT/US2011/001109, International Search Report mailed Oct. 21, 2011", 2 pgs.

"International Application Serial No. PCT/US2011/001109, Written Opinion mailed Oct. 21, 2011", 6 pgs.

Sengupta, C, et al., "Solving the SVD updating problem for subspace tracking on a fixed sized linear array of processors", IEEE Intl. Conf. on Acoustics, Speech and Signal Processing, vol. 5, (Apr. 1997), 4137-4140.

Schmidt, R. O., "Multiple Emitter Location and Signal Parameter Estimation", *IEEE Transactions on the Antennas and Propagation*, vol. AP-34, No. 3, (1986), 276-280.

* cited by examiner

RECEIVING STATION
(ALTERNATE EMBODIMENTS)

STANDING WAVES CAUSED BY THREE SIMULTANEOUS SIGNALS

VECTOR PROJECTION

RECEIVING STATION AND METHODS FOR DETERMINING AN ANGLE-OF-ARRIVAL OF SHORT-DURATION SIGNALS USING SURFACE-ACOUSTIC-WAVE (SAW) DEVICES

TECHNICAL FIELD

Embodiments pertain to systems and methods determining an angle-of-arrival (AOA) of signals transmitted by a transmitting device. Some embodiments pertain to determining a location of a transmitting device. Some embodiments pertain to determining a time-difference-of-arrival (TDOA) between signals transmitted by a transmitting device, including for short-duration signals or signals with low signal-to-noise ratios (SNRs). Some embodiments relate to electronic warfare systems.

BACKGROUND

One conventional technique for determining the location of a device is triangulation. Triangulation involves determining angles to the device from known points at either end of a fixed baseline. To use triangulation to determine the location of a transmitting device, the angles of arrival of signals received from the transmitting device may be measured at two or more receiving locations. The angles of arrival define lines of position between the transmitting device and the receiving locations. The intersection of these lines-of-position may be used to form an estimate of the transmitting device's location.

Transmitting devices that transmit shorter-duration signals or signals with lower SNRs are more difficult to locate than devices that transmit longer-duration signals or signals with higher SNRs. This is because accurate angles-of arrival are more difficult to obtain for shorter-duration signals and signals with low SNRs (e.g., due to longer sampling times, among other things).

Thus, there are general needs for systems and methods to accurately determine a TDOA of signals received from transmitting devices, particularly transmitting devices that transmit short-duration signals or signals with low SNRs. There are general needs for systems and methods to accurately determine an AOA of signals received from transmitting devices, particularly a transmitting device that transmits short-duration signals or signals with low SNRs. There are also needs for systems and methods to accurately determine a location of a transmitting device, particularly a transmitting device that transmits short-duration signals or signals with low SNRs.

SUMMARY

Embodiments of a system and method for determining an AOA of signals received from a transmitting device are described herein. Signals from the transmitting device are received through two or more pairs of spatially-diverse antennas. A non-inverted version of the signals received through a first antenna of a pair is injected into a first input of a surface-acoustic-wave (SAW) device. An inverted version of the signals received through a second antenna of the pair is injected into a second input of the SAW device. Signals present at tap outputs are processed to determine a TDOA between the signals received through each pair of antennas. The AOAs may be calculated from the TDOAs determined from two or more pairs of antennas.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
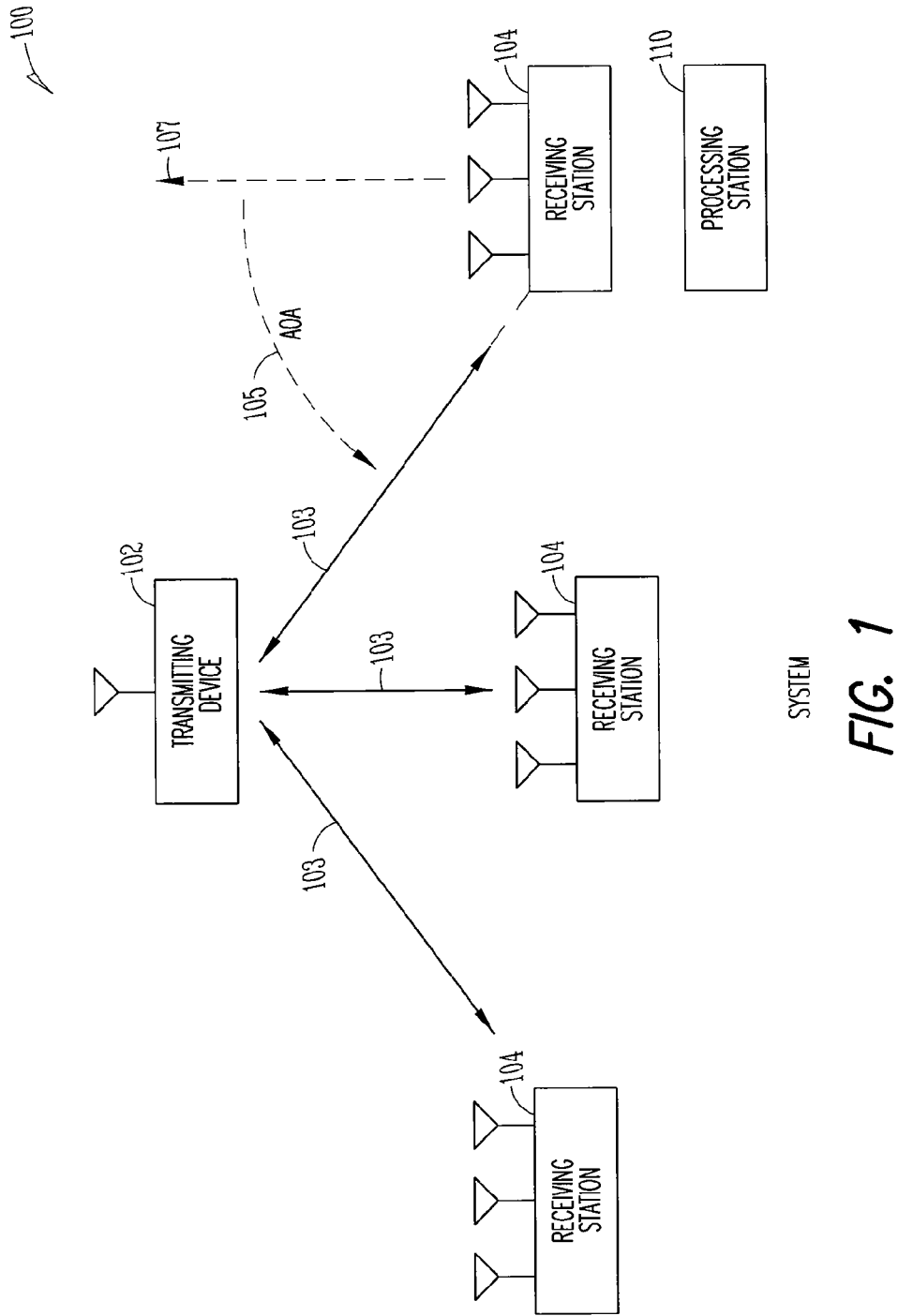
FIG. 1 is a location-determining system, in accordance with some embodiments.

FIG. 1 is a location-determining system, in accordance with some embodiments. Location-determining system 100 may be configured for determining the location of a transmitting device 102 based on signals 103 transmitted by the transmitting device 102. The signals 103 transmitted by the transmitting device 102 may comprise short-duration signals and signals with low SNR, although this is not a requirement.

Location-determining system 100 may include a plurality of receiving stations 104. Each receiving station 104 may be configured to determine an AOA 105 of the signals 103 transmitted from the transmitting device 102. The system may also include location-determining circuitry to determine the location of the transmitting device 102 from each of the AOAs. The location-determining circuitry may be present within any one or more of the receiving stations 104 or within a separate processing station 110.

In accordance with embodiments, each receiving station 104 may use a plurality of spatially-diverse antennas to receive signals from the transmitting device 102. Each receiving station 104 may also include receiver circuitry to receive signals transmitted by the transmitting device 102 through pairs of the antennas. Each receiving station 104 may also include a SAW device. In accordance with some embodiments, the receiver circuitry may be configured to inject a non-inverted version of the signals received through a first antenna into a first input of the SAW device and inject an inverted version of the signals received through a second antenna into a second input of the SAW device. Each receiving station 104 may also include processing circuitry to process signals present at tap outputs of the SAW device to determine a TDOA between the signals received through a pair of antennas. In some embodiments, the processing circuitry may determine the AOA 105 based on the TDOA determined for two or more pairs of antennas. These embodiments are discussed in more detail below.

In some embodiments, the location-determining circuitry may be provided within any one of the receiving stations 104, while in other embodiments, the location-determining circuitry may be provided at the separately-located processing station 110. In these embodiments, each receiving station 104 may transmit or provide an AOA 105 that the receiving station 104 has determined for the transmitting device 102, along with additional information, to the location-determining circuitry to allow the location-determining circuitry to determine the location of the transmitting device 102. The additional information may include the location of the receiving station 104.

The AOA 105 for a particular receiving station 104 may be determined with respect to a predetermined direction, such as direction 107, or common reference of the receiving station 104. In these embodiments, the predetermined orientation of the receiving station may be used to determine the AOA 105 for each receiving station 104 to determine the location of the transmitting device 102.

In some embodiments, the receiving stations 104 may be part of an electronic-warfare (EW) system which may use the location of the transmitting device 102 for targeting a guided-projectile or a missile. In some other embodiments, the receiving stations 104 may be base stations of a wireless communication system, and transmitting device 102 may be a mobile or wireless communication device, such as cellular telephone or smart phone.

Figure 2:
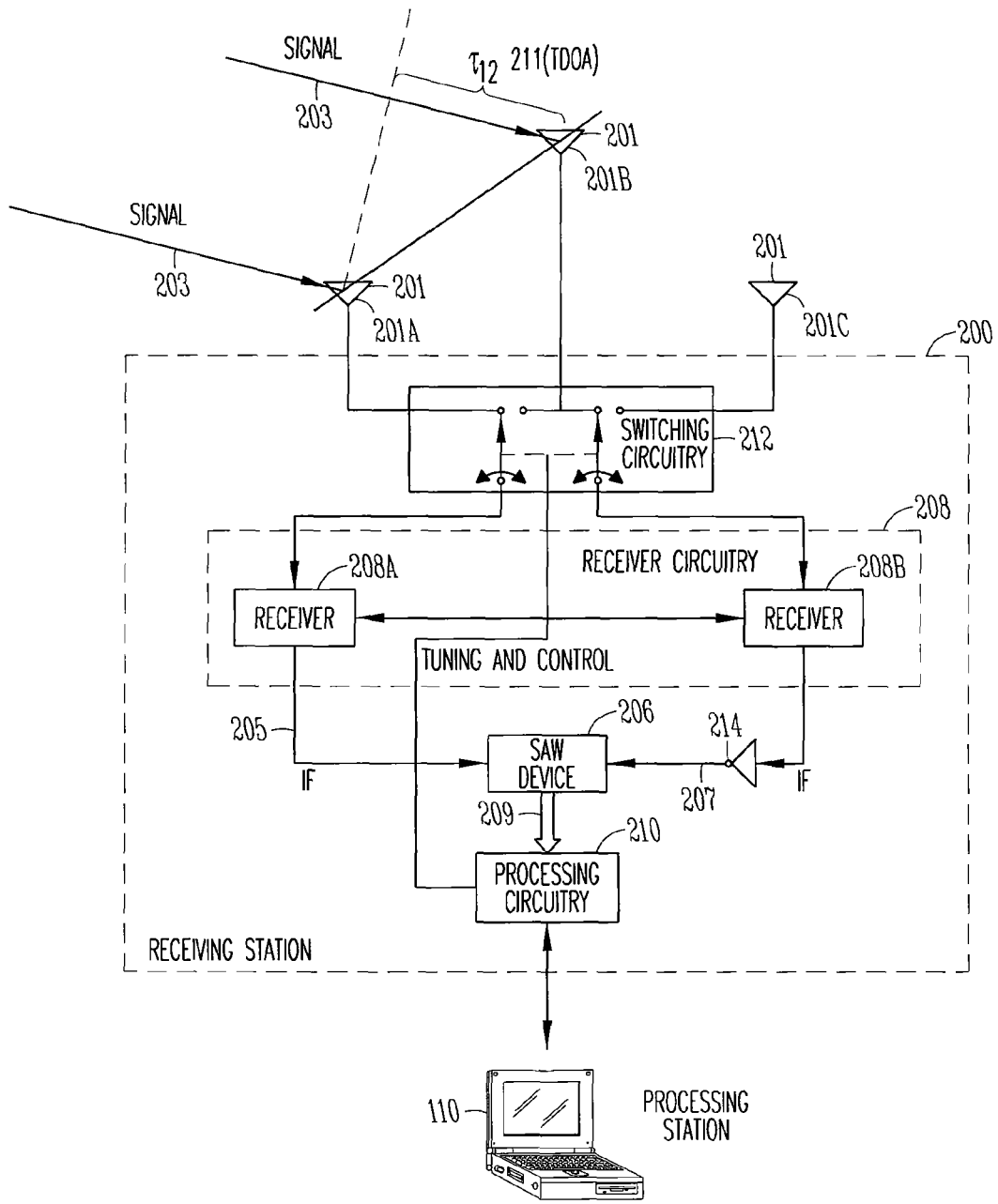
FIG. 2 is a block diagram of a receiving station, in accordance with some embodiments.

FIG. 2 is a block diagram of a receiving station, in accordance with some embodiments. Receiving station 200 may be suitable for use as any one or more of receiving stations 104 (FIG. 1). Receiving station 200 may comprise a plurality of spatially-diverse antennas 201, a SAW device 206, receiver circuitry 208 and processing circuitry 210. The SAW device 206 may have a plurality of tap outputs 209. The receiver circuitry 208 may be configured to receive signals 203 transmitted by a transmitting device, such as transmitting device 102 (FIG. 1), through a spatially-diverse pair of the antennas (e.g., antennas 201A and 201B). The processing circuitry 210 may be configured to process signals present at the tap outputs 209 to determine a TDOA 211 between the signals 203 received through the pair of antennas.

The receiver circuitry 208 may be configured to inject a non-inverted version 205 of the signals received through a first antenna (e.g., antenna 201A) of the pair into a first input of the SAW device 206 and to inject an inverted version 207 of the signals received through a second antenna (e.g., antenna 201B) of the pair into a second input of the SAW device 206. The processing circuitry 210 may process signals present at the tap outputs 209 to determine the TDOA 211 between the signals received through the antennas of the first pair (e.g., antennas 201A and 201B).

In these embodiments, the processing circuitry 210 may be configured to cause the receiving station 200 to select a second pair of antennas 201 (e.g., antennas 201B and 201C) for receipt of signals from the transmitting device 102. The receiver circuitry 208 may be configured to inject a non-inverted version 205 of the signals received through one antenna (e.g., antenna 201B) of the second pair into the first input of the SAW device 206 and to inject an inverted version 207 of the signals received through a second antenna (e.g., antenna 201C) of the second pair into the second input of the SAW device 206. The processing circuitry 210 may also be configured to process signals present at the tap outputs 209 to determine a TDOA between the signals received through the antennas of the second pair (e.g., antennas 201B and 201C).

For each selected pair of antennas 201, the processing circuitry 210 may process the signals present at the tap outputs 209 with a processing algorithm to determine the TDOA between the between the signals 203 received through the selected pair of antennas. In some embodiments, a subspace-based processing algorithm to determine the TDOA between the signals 203 received through the selected pair of antennas. In some embodiments, a subspace-based processing algorithm, such as a multiple signal classification (MUSIC) algorithm, may be used to determine the TDOA between the signals 203 received through the selected pair of antennas.

The receiving station 200 may include an inverter 214 or other circuitry to generate the inverted version 207 of the signals for injection into the second input of the SAW device 206. In some embodiments, the signals injected into the first and second inputs of the SAW device 206 comprise counter-propagating signals since they are propagating in opposite directions within the SAW device 206. The interaction of these counter-propagating signals may set up a standing wave pattern within the SAW device 206. This is discussed in more detail below.

The TDOA between the signals 203 received through a first pair of antennas (e.g., antennas 201A and 201B) and the TDOA between the signals 203 received through a second pair of antennas (e.g., antennas 201B and 201C) may used to determine the AOA 105 (FIG. 1) of the signals. The AOA 105 may indicate a direction from the receiving station 200 to the transmitting device 102. In some embodiments, signal coding, such as spreading codes, may be used to distinguish signals 203 transmitted by the transmitting device 102 from other signals.

In some embodiments, each receiving station 104 (FIG. 1) may determine a time-of-arrival (TOA) of signals received from the transmitting device 102. The TOAs from more of the receiving stations 104 may be used for determining the location of the transmitting device 102. In these embodiments, the TOA from each of the receiving stations 104 may be forwarded to a processing location, such as processing station 110 or one of the receiving stations 104, and a TDOA between the receiving stations 104 may be determined. Based on the TDOAs between three or more receiving stations 104, the location of the transmitting device 102 may be determined using a conventional curve-intersection technique.

In these embodiments, the signals received through a selected pair of antennas 201 may be replicas of one another. Due to the separation of the antennas, one of the signals may be delayed with respect to other signals. In some embodiments, the antennas 201 of the receiving station 200 may be separated by less than half a wavelength of the frequency of the signals to be received from the transmitting device 102.

In some embodiments, the distance between the transmitting device 102 and each of the receiving stations 104 may be large enough (e.g., greater than ten wavelengths) so that the signals 103 received at any of receiving stations 104 may be assumed to be a plane wave. In situations in which the distance between the transmitting device 102 and a receiving station 104 is less than ten wavelengths, additional processing may be performed to correctly determine the AOA.

The receiving station 200 may include switching circuitry 212. The switching circuitry 212 may be configurable (e.g., by the processing circuitry 210) to select a pair of antennas 201 to allow the processing circuitry 210 to determine the TDOA between the signals received by the selected pair of antennas.

The receiver circuitry 208 may include a first receiver 208A to receive signals through a first antenna of a selected pair and a second receiver 208B to receive signals through a second antenna of the selected pair. Each receiver 208A, 208B may down-convert the received signals and generate an intermediate frequency (IF) output. The IF output of the first receiver 208A may be injected into the first input of the SAW device 206, and the IF output of the second receiver 208B may be inverted (e.g., by inverter 214) and injected into the second input of the SAW device 206.

The switching circuitry 212 may be configured to reverse polarity of the received signals to reduce or eliminate any phase mismatch in the receiving chain. In these embodiments, the signals received through the first antenna 201A of a selected pair are initially injected into the first input of the SAW device, and the inverted version 207 of the signals received through the second antenna 201B of the selected pair are injected into the second input of the SAW device 206. The processing circuitry 210 may measure the signals present at the tap outputs 209. The polarity of the switching circuitry 212 may then be reversed and the signals received through the second antenna 201B are injected into the first input of the SAW device, and an inverted version 207 of the signals received through the first antenna 201B are injected into the second input of the SAW device 206. The processing circuitry 210 may measure the signals present at the tap outputs 209. Any phase mismatch in the receiving chain may be averaged out.

The SAW device 206 may comprise a SAW delay line. For each selected pair of antennas, the signals injected into the SAW device 206 may set up a standing wave within the SAW device 206. The processing circuitry 210 may determine the TDOA based on the signals present at the tap outputs 209 that represent the standing wave. The signals present at the tap outputs 209 may comprise voltage levels that may be measured by the processing circuitry 210. Unlike a conventional SAW device which generally has a single input and a single output, SAW device 206 has two inputs, which allow two signals to be concurrently injected and a plurality of tap outputs.

Although receiving station 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors (DSPs), application specific integrated circuits (ASICs), radio-frequency integrated circuits (RFICs) and combinations of various hardware and logic circuitry for performing at least the functions described herein. In some embodiments, the functional elements of receiving station 200 may refer to one or more processes operating on one or more processing elements.

Figure 3:
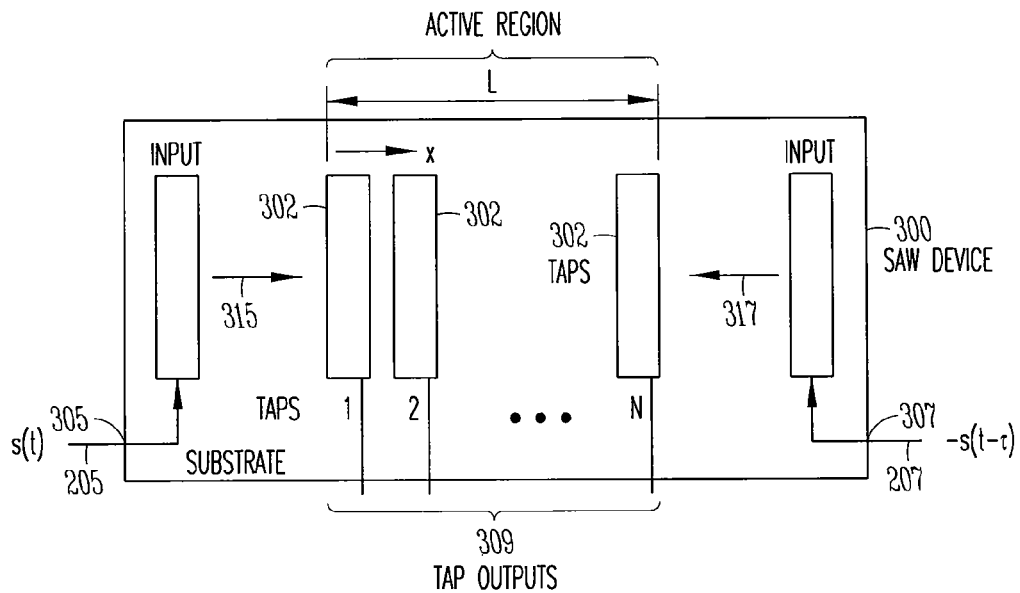
FIG. 3 illustrates a SAW device, in accordance with some embodiments.

FIG. 3 illustrates a SAW device in accordance with some embodiments. SAW device 300 may be suitable for use as SAW device 206 (FIG. 2) although other configurations may also be suitable. SAW device 300 may be a SAW delay line having a first input 305, a second input 308, and a plurality of taps 302. Each tap 302 may be associated with a tap output 309. Tap outputs 309 may correspond to tap outputs 209 (FIG. 2). As discussed above, the receiver circuitry 208 (FIG. 2) may inject a non-inverted version 205 of the signals received through a first antenna into the first input 305 and may inject an inverted version 207 (FIG. 2) of the signals received through a second antenna into the second input 307.

As illustrated in FIG. 3, the signals received through the first antenna and the signals received through the second antenna are injected into opposite ends of the SAW device propagate in opposite directions 315, 317 to set up the standing wave within the SAW device 300. In these embodiments, the first and second inputs (305 and 307) of the SAW device 300 are provided on opposite ends of the SAW device.

As further illustrated in FIG. 3, the version 205 of the signals received through the first antenna injected into the first input 305 may be represented as s(t) while the inverted version 207 of the signals received through the second antenna injected into the second input 307 may be represented as −s(t−τ), where τ is the TDOA between the signals. Although the inverted version 207 of the signals is described as being delayed by τ with respect to the non-inverted version 205, it may be noted that either signal may be the delayed version depending on the relative positioning of the antennas 201.

The taps 302 of SAW device 300 may have the same length and may have the same spacing therebetween, although this is not a requirement. In some alternate embodiments, the taps 302 may have a taper, such as a Gaussian taper, and the spacing between the taps may be non-linear.

Figure 4:
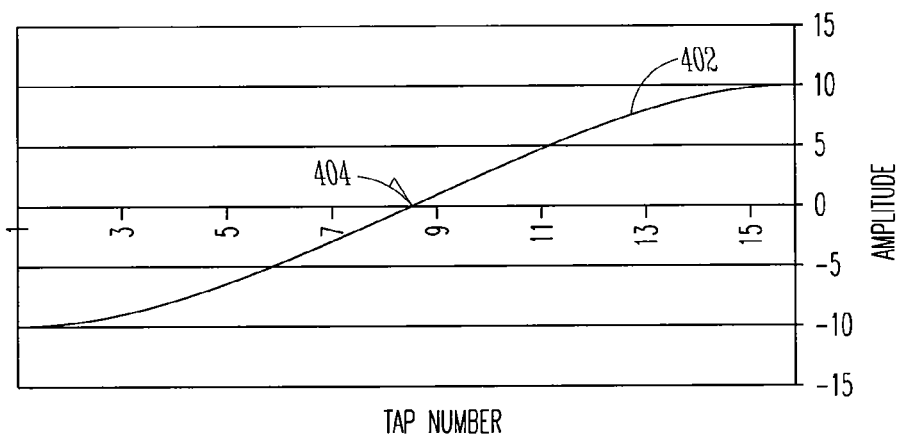
FIG. 4 illustrates a standing wave within a SAW device, in accordance with some embodiments.

FIG. 4 illustrates a standing wave within a SAW device, in accordance with some embodiments. Standing wave 402 may be set up within the SAW device 300 (FIG. 3) as a result of the signals concurrently injected into the opposite ends of the SAW device 300. The processing circuitry 210 (FIG. 2) may determine a TDOA between the injected signals based on a zero-crossing 404 of the standing wave 402. The zero-crossing 404 may be determined based on the signals present at the tap outputs 309 (FIG. 3). In FIG. 4, the tap numbers of the taps 302 (FIG. 3) are illustrated in the X-direction and the amplitude of the standing wave 402 is illustrated in the Y-direction.

In some embodiments, the signals transmitted by transmitting device 102 (FIG. 1) may include short-duration signals, such as frequency-hopping signals. The duration of the signals transmitted by transmitting device 102 may be less than one-hundred microseconds and may be as short as ten microseconds in some embodiments. In these embodiments, the processing circuitry 210 (FIG. 2) may perform a sampling and averaging process to average the samples present at the tap outputs 309 to reduce the effects of noise. In some embodiments, ten or more samples may be averaged.

In some embodiments, receiver circuitry 208 (FIG. 2) may be a frequency-hopping receiver, such as frequency-hopping spread spectrum (FHSS) receiver that may hop to particular frequencies based on a known spreading sequence. In some embodiments, a cryptographic technique may be used to generate a channel sequence under the control of a secret transmission security (TRANSEC) key that is shared by the transmitting device 102 and the receiving station 200.

In an example embodiment, signals having a duration as short as ten micro-seconds may be received from the transmitting device 102 and used for determining TDOAs or AOAs when the response time of the SAW device 300 is on the order of ten microseconds. In these embodiments, ten or more such sample times may be used by the processing circuitry 210.

In some embodiments, the signals present at the tap outputs 309 comprise tap-output vectors. Each tap-output vector may correspond to a frame of data. In these embodiments, the processing circuitry 210 may process each tap-output vector by sampling the tap-output vector present at tap outputs 309. The sampled tap-output vector may be converted to digital form. The processing circuitry 210 may also determine an estimated sample covariance matrix [R] from sampled and digitized tap-output vectors, perform a singular-value decomposition (SVD) of the estimated sample covariance matrix, and generate eigenvectors from the SVD. The processing circuitry 210 may also partition the eigenvectors into noise and signal eigenvectors and determine the TDOA from the signal eigenvectors. In some embodiments, analog-to-digital converters may be used to convert the sampled tap-output vector to digital form.

In some embodiments, the processing circuitry 210 may use a calibration table for use in more accurately determining the AOA. The calibration table may be generated based on a calibration for the particular SAW device 206 of the receiving station 200 as well as for the particular antenna configuration of the receiving station 200. In these embodiments, the SAW device 206 may be calibrated for different frequencies, elevation angle of arrival and azimuth angle.

Figure 5:
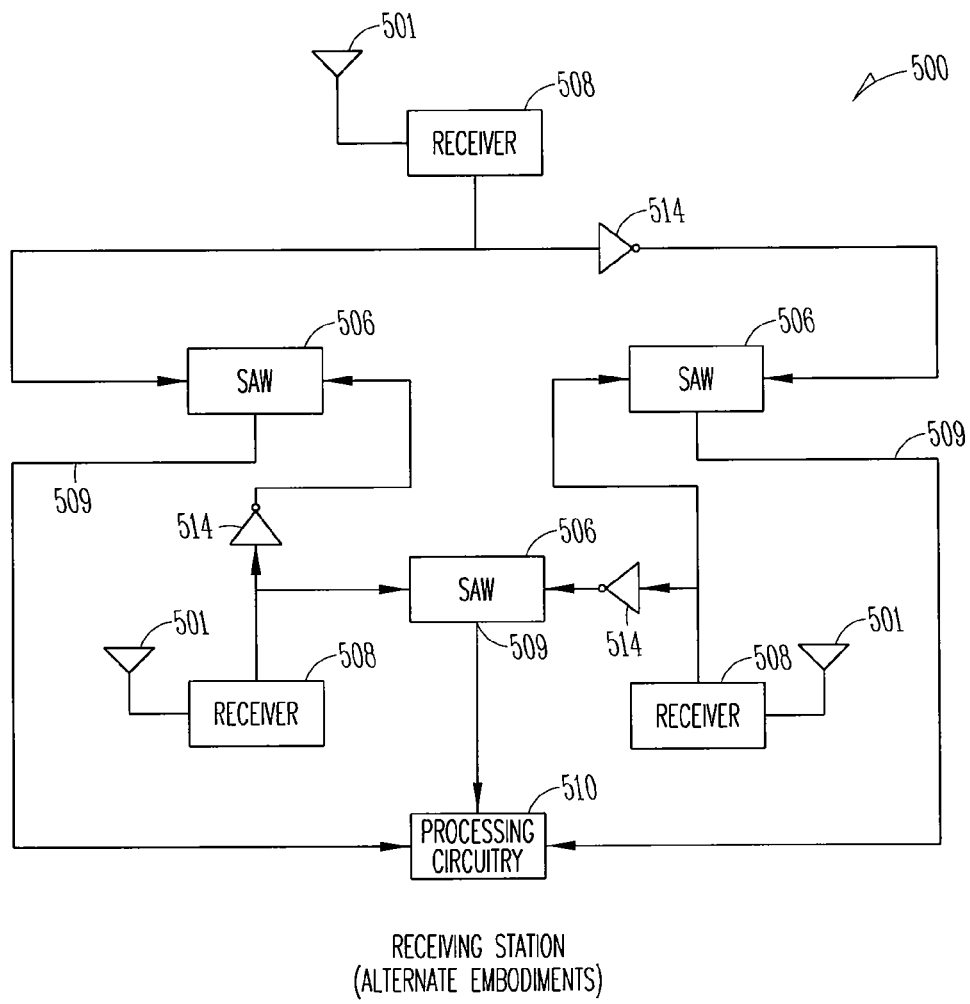
FIG. 5 is a block diagram of a receiving station, in accordance with some alternate embodiments.

FIG. 5 is a block diagram of a receiving station, in accordance with some alternate embodiments. Receiving station 500 may be suitable for use as any one or more of receiving stations 104 (FIG. 1). Receiving station 500 may comprise a plurality of spatially-diverse antennas 501, a receiver 508 associated with each of the antennas, and a plurality of SAW devices 506. Each SAW device 506 may be associated with a different pair of the antennas 501.

In accordance with these alternate embodiments, the receivers 508 are configured to inject a non-inverted version of signals received from the transmitting device 102 (FIG. 1) into an input of one of the SAW devices 506 and inject an inverted version of the signals received from the transmitting device 102 into an input of another SAW device 506. An inverter 514 may be provided for each SAW device 506 to invert one of the signals from one of the receivers 508. The processing circuitry 510 may process signals present at the tap outputs 509 of at least two of the SAW devices 506 to determine TDOA between the signals received by at least two pairs of the antennas 501. Although receiving station 500 is capable of determining a TDOA between signals received between any pair of antennas, the AOA of the received signals may be determined based on the TDOAs determined from as little as two pairs of antennas 501.

Figure 6:
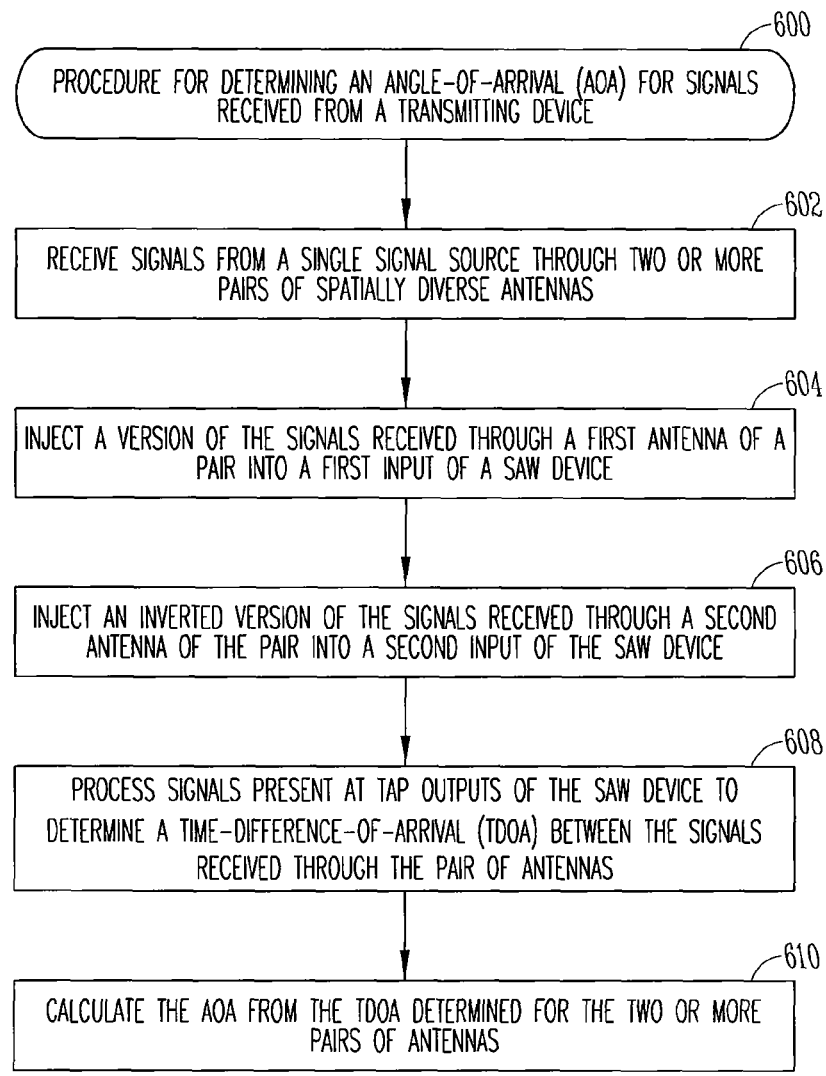
FIG. 6 illustrates a procedure for determining an AOA of signals received from a transmitting device, in accordance with some embodiments.

FIG. 6 illustrates a procedure for determining an AOA of signals received from a transmitting device, in accordance with some embodiments. Procedure 600 may be performed by a receiving station, such as receiving station 200 (FIG. 2) or receiving station 500 (FIG. 5), although other receiving devices may be configured to perform procedure 600.

Operation 602 includes receiving signals from a transmitting device through two or more pairs of spatially-diverse antennas.

Operation 604 includes injecting a non-inverted version of the signals received through a first antenna of a pair into a first input of a SAW device. Operation 606 includes injecting an inverted version of the signals received through a second antenna of the pair into a second input of the SAW device. Operations 604 and 606 are performed concurrently to set up a standing wave within the SAW device.

Operation 608 includes processing signals present at tap outputs to determine a TDOA between the signals received through the pair of antennas. Operations 602 through 608 may be repeated for two or more pairs of antennas to determine a TDOA between the signals received through each pair of antennas.

Operation 610 may include calculating an AOA of the signals from the TDOAs determined for two or more pairs of antennas. In some embodiments, the AOA for more than one receiving station may be used to calculate the location of the transmitting device with respect to the receiving stations.

Additional Analysis

The following is an analysis suitable for some of the embodiments discussed above. As discussed above, due to superposition, counter-propagating signals injected into the two ends of a SAW delay line, one the negative and delayed version of the first signal, may form one or more standing waves within the SAW device. These standing waves are of the form $$\alpha_i(x) = A_i \sin(\beta x - \pi f \tau_i) \quad (1)$$

where x represents the lateral distance from one end of the active region of length L within the SAW, $\beta$ is a constant associated with the SAW, f is the operating frequency of the SAW, $A_i$ is the amplitude of the $i^{th}$ waveform, and $\tau_i$ is the time delay difference of signal i at the two ends of the SAW device. At any given time there will be a finite number of standing waveforms present, which will be denoted herein by R. In general, R is unknown and the task at hand is to determine the parameters of these waveforms from the measurement of the output of the SAW device.

N will denote the number of taps in the SAW. Typical values for N are 16-64. A typical standing wave in such a device when there is only one signal present and no noise added is shown in FIG. 4.

Figure 7:
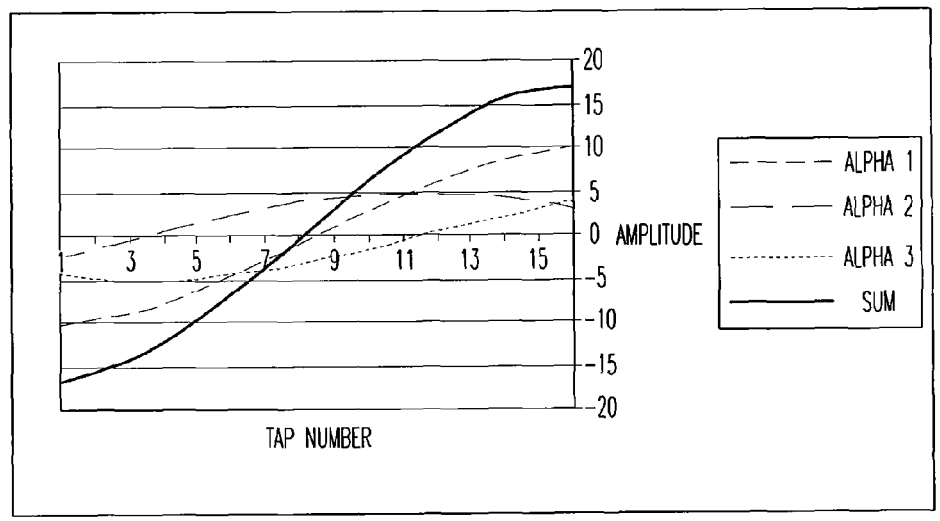
FIGS. 7-16 are illustrations for an analysis, in accordance with some embodiments.

When there is more than one signal present, they interact within the SAW. Three signals and their sum, which is the standing wave observed at the output taps, are shown in FIG. 7. Notice that the sum of the three standing waveforms is of the same functional shape as the constituent waveforms. The amplitudes of the constituent waveforms affect the zero crossing of the sum waveform. When there are two signals present, the composite signal measured at the SAW taps is given by $$\alpha(x) = \alpha_1(x) + \alpha_2(x) = A_1 \sin(\beta x - \pi f \tau_1) + A_2 \sin(\beta x - \pi f \tau_2) \quad (2)$$

Using trigonometric identities to manipulate this expression we obtain $$x = \frac{1}{\beta} \tan^{-1} \left[ \frac{A_1 \sin(\pi f \tau_1) + A_2 \sin(\pi f \tau_2)}{A_1 \cos(\pi f \tau_1) + A_2 \cos(\pi f \tau_2)} \right] \quad (3)$$

as the point where $\alpha(x)$ has a zero crossing. In general, with R signals present, the zero crossing will be at $$x = \frac{1}{\beta} \tan^{-1} \left[ \frac{\sum_{i=1}^{R} A_i \sin(\pi f \tau_i)}{\sum_{i=1}^{R} A_i \cos(\pi f \tau_i)} \right] \quad (4)$$

Figure 8:
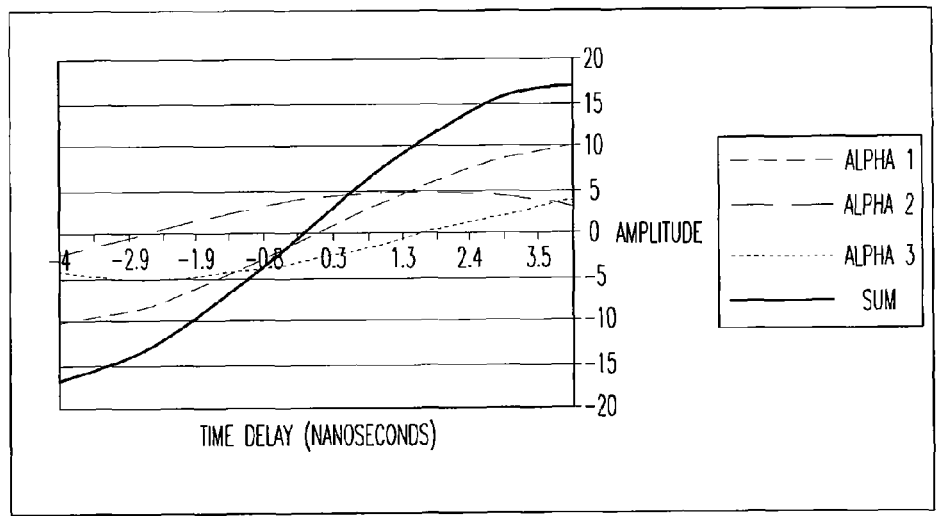

When plotted against time delay instead of tap number, it is more convenient to place zero time delay in the center of the active area, with negative delays to the left of center and positive delays to the right. Such a graph for the data above is shown in FIG. 8. The set of functions $\{\alpha_i(x)\}$ forms a real, infinite dimensional, Euclidean vector space, denoted by V. This space possesses an inner product defined by $$(\alpha_i, \alpha_j) = \int_{-L/2}^{L/2} \alpha_i(x) \alpha_j(x) dx \quad (1)$$

which is calculated to be $$(\alpha_i, \alpha_j) = \frac{A_i A_j}{2} \left[ L \cos(\pi f (\tau_j - \tau_i)) + \frac{1}{\beta} \sin(\pi f (\tau_j + \tau_i)) \cos(\beta L) \right]$$

Figure 9:
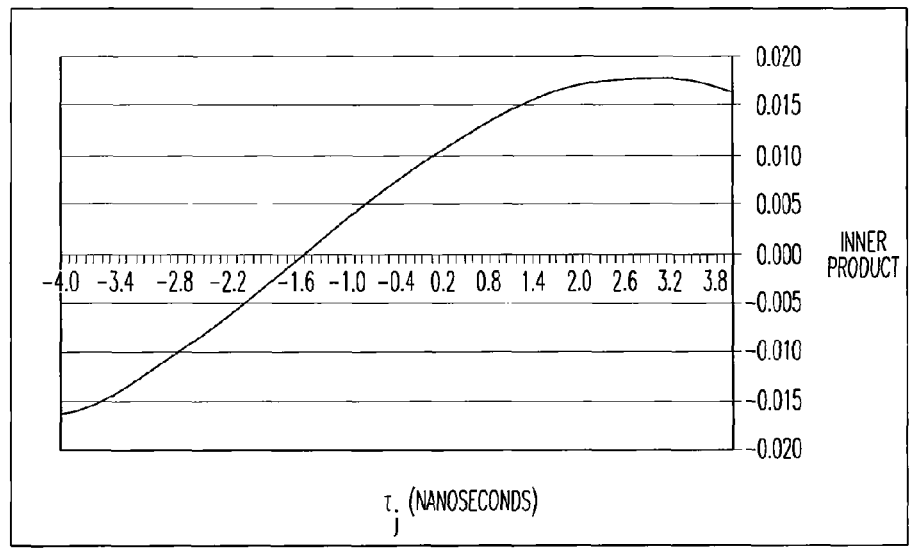

In general $(\alpha_i, \alpha_j) \neq 0$ so $\{\alpha_i\}$ is not an orthogonal set of vectors. A typical inner product using the same parameters as above is shown in FIG. 9. For this example, $\tau_i = 2.5$ nanoseconds and the inner product is plotted versus Note that the abscissa is time delay.

In general the space described above is infinite dimensional. In practice, a finite dimensional space is used by assuming that the signals can only arrive at discrete values of angles, such as in one-degree increments for example. A signal arriving then from an arbitrary angle is "fit" to the finite calibration data. Thus the difficulties of dealing with an infinite dimensional vector space are avoided.

As with any other vector space, the length of vector $\alpha$ is given by $$\|\alpha\| = (\alpha_1^2 + \alpha_2^2 \ldots \alpha_n^2)^{1/2} \tag{2}$$

and the distance d between two vectors $\alpha_i(x)$ and $\alpha_j(x)$ is given by $$d = \|((\alpha_{i_1} - \alpha_{j_1})^2 + (\alpha_{i_2} - \alpha_{j_2})^2)^{1/2}\| \tag{3}$$

The vectors are linearly independent since none can be expressed as a linear sum of the others; however, by definition, the sum of the signals present in any frame is always a dependent function of these vectors. V is a linear manifold of the vector space consisting of all continuous functions defined on $(-L/2, L/2)$.

The set of vectors $\{\alpha_i\}$ can be normalized to a length of one by dividing by their length, forming a set $\{\beta_i\}$ by $$\beta_i = \frac{\alpha_i}{\|\alpha_i\|} \tag{8}$$

$$\|\alpha_i\| = (\alpha_i, \alpha_i)^{1/2} = \frac{A_i}{\sqrt{2}} \left[L + \frac{1}{\beta}\sin(2\pi f \tau_i)\cos(\beta L)\right]^{1/2}$$

$$\beta_i = \frac{\sqrt{2}}{\left[L + \frac{1}{\beta}\sin(2\pi f \tau_i)\cos(\beta L)\right]^{1/2}} \sin(\beta x - \pi f \tau_i)$$

Figure 10:
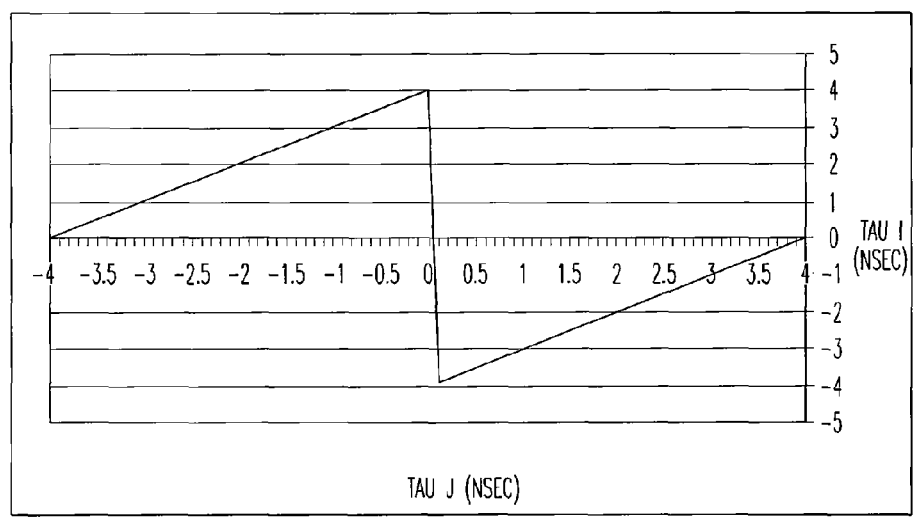

The values of $\tau_i$ and $\tau_j$ where $(\beta_i, \beta_j) = 0$, and thus $\beta_i$ and $\beta_j$ are orthogonal, for the example parameters above, are plotted in FIG. 10. The sampling of the standing waves by the output transducers produces a sampled version of the above equation. For N=16, the expression for this sample waveform is $$\hat{\alpha}_i(k) = A_i \sin\left(\frac{\pi}{N}k - 1.669 - \pi f \tau_i\right) \tag{9}$$

where k is the tap number, k=1, 2, ..., 16, and all angles are in radians. Successive samples of tap data are collected. Each of these samples corresponds to a single frame. Since, in general, RF signals are stochastic in nature, due to random noise as well as other reasons such as signal fading and modulation effects, the samples from frame to frame will be different.

Figure 11:
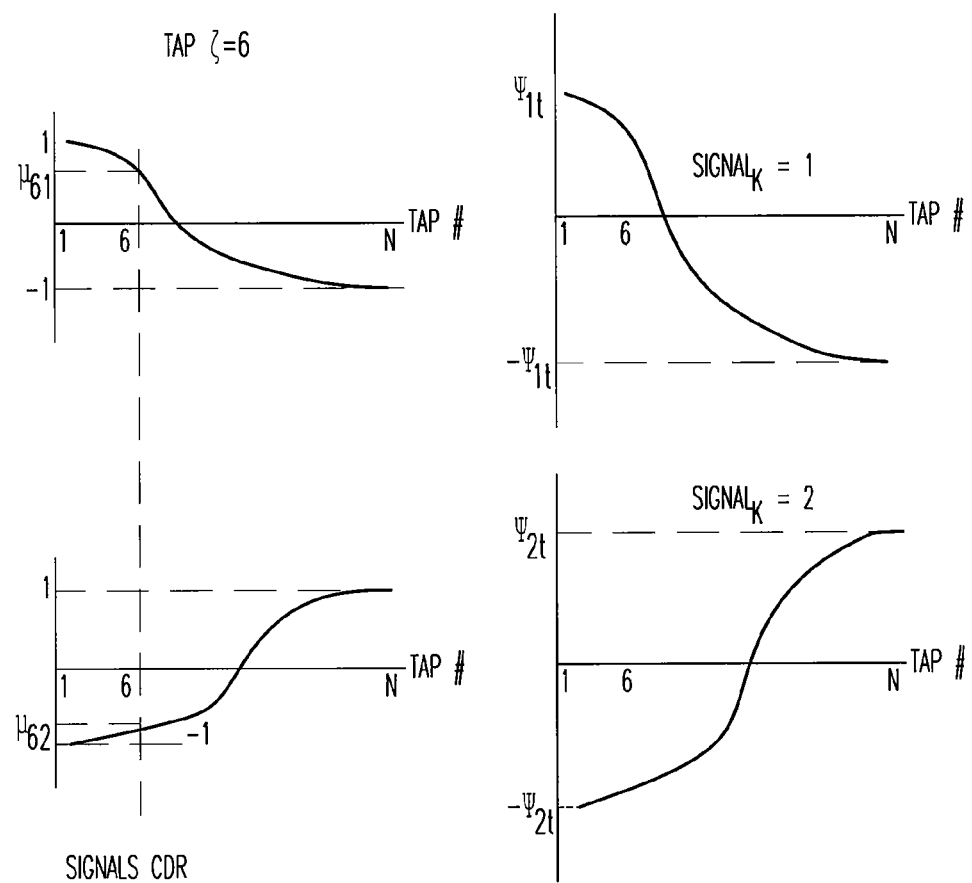

Let $\mu_{jk}$ denote the contribution of signal k of unit amplitude to tap j and if the amplitude of signal k in frame i is $\psi_{ki}$, the signal $v_{jk}$ at tap j without considering noise is determined by summing over all these signals. An example of these notions is shown in FIG. 11 for two signals, tap #6 and frame i. Thus for R signals and N taps $$v_{1i} = \mu_{11}\psi_{1i} + \mu_{12}\psi_{2i} + \ldots + \mu_{1R}\psi_{Ri} \tag{10}$$
$$v_{2i} = \mu_{21}\psi_{1i} + \mu_{22}\psi_{2i} + \ldots + \mu_{2R}\psi_{Ri}$$
$$\vdots$$
$$v_{Ni} = \mu_{N1}\psi_{1i} + \mu_{N2}\psi_{2i} + \ldots + \mu_{NR}\psi_{Ri}$$

or $$v_{ji} = \sum_{k=1}^{R} \mu_{jk}\psi_{ki} \tag{11}$$

In this expression, the product $\mu_{jk}\psi_{ki}$ represents the component of the voltage at tap j due to standing wave k during frame i. Note that if there is only one standing waveform present, then there is only one term on the right side of these equations. With noise components $\eta_{ji}$ included this becomes $$v_{ki} = \sum_{k=1}^{R} \mu_{jk}\psi_{ki} + \eta_{ji} \tag{12}$$

$$v_i = M\psi_i + \eta_i \tag{13}$$

In this equation, $v_i$, $\eta_i$ and $\psi_i$ vary from frame to frame while matrix M is constant. M is a function of the constant SAW geometry and of the signal arrival time differences at the two antennas attached to the ends of the SAW (and thus the angles of arrival), assumed constant over the duration of interest. Again, if there is only one standing waveform present, then M is a column vector. Such column vectors herein will be denoted by $m^{<i>}$. $\eta_i$ varies because of the random characteristics of Gaussian noise. $\psi_i$ also varies due to random variations in the signals caused by effects other than noise. Such effects include fading, random modulation, and so forth on the antenna signals used to derive $\psi_i$.

It is assumed that the noise is uncorrelated from one tap to the next as well as one frame to the next, and Gaussian with zero mean and variance (power) $\sigma^2$. Using the notation $E\{x\}$ for the expected value of x, we then have $$E\{\eta_{ji}\} = 0 \tag{14}$$

$$E\{\eta_{ji}\eta_{ki}\} = \sigma^2 \delta_{jk} \tag{15}$$

where $\delta_{jk}$ is the Kronecker delta function. The expected value of a matrix is the matrix of the element expected values, to wit, $$E\left\{\begin{bmatrix} x_1 & x_2 \\ x_3 & x_4 \end{bmatrix}\right\} = \begin{bmatrix} E\{x_1\} & E\{x_2\} \\ E\{x_3\} & E\{x_4\} \end{bmatrix} \tag{16}$$

The conjugate transpose of a matrix $G = [g_{ij}]$ is that matrix denoted by $G^H$ with entries $g_{ij} = \bar{g}_{ji}$, where the over bar denotes conjugation. $G^H$ is sometimes called the Hermitian of G. Also, given matrix G such that $g_{ij} = \bar{g}_{ji}$, then G is said to be a Hermitian matrix. First consider the case with no additive noise. Then $$v_k = \begin{bmatrix} v_{1k} \\ v_{2k} \\ \vdots \\ v_{Nk} \end{bmatrix} = M\psi_k \tag{17}$$

-continued $$= \begin{bmatrix} \mu_{11} & \mu_{12} & \cdots & \mu_{1R} \\ \mu_{21} & \mu_{22} & \cdots & \mu_{2R} \\ \vdots & \vdots & \ddots & \vdots \\ \mu_{N1} & \mu_{N2} & \cdots & \mu_{NR} \end{bmatrix} \begin{bmatrix} \psi_{1k} \\ \psi_{2k} \\ \vdots \\ \psi_{Rk} \end{bmatrix}$$

$$= \begin{bmatrix} A_1 \sin(\beta x_1 - \pi f \tau_1) + A_2 \sin(\beta x_1 - \pi f \tau_2) + \ldots + \\ A_R \sin(\beta x_1 - \pi f \tau_R) \\ A_1 \sin(\beta x_2 - \pi f \tau_1) + A_2 \sin(\beta x_2 - \pi f \tau_2) + \ldots + \\ A_R \sin(\beta x_2 - \pi f \tau_R) \\ \vdots \\ A_1 \sin(\beta x_N - \pi f \tau_1) + A_2 \sin(\beta x_N - \pi f \tau_2) + \ldots + \\ A_R \sin(\beta x_N - \pi f \tau_R) \end{bmatrix}$$

where the $x_i$ are the locations of the taps in the active region of the SAW, R is the number of standing waveforms present (a number to be determined). In the absence of noise, these matrices and vectors do not change value since they originate from multiple standing waves within the SAW. This vector can then be written as $$v_k = \begin{bmatrix} \sin(\beta x_1 - \pi f \tau_1) & \sin(\beta x_1 - \pi f \tau_2) & \cdots & \sin(\beta x_1 - \pi f \tau_R) \\ \sin(\beta x_2 - \pi f \tau_1) & \sin(\beta x_2 - \pi f \tau_2) & \cdots & \sin(\beta x_2 - \pi f \tau_R) \\ \vdots & \vdots & \ddots & \vdots \\ \sin(\beta x_N - \pi f \tau_1) & \sin(\beta x_N - \pi f \tau_2) & \cdots & \sin(\beta x_N - \pi f \tau_R) \end{bmatrix} \begin{bmatrix} A_1 \\ A_2 \\ \vdots \\ A_R \end{bmatrix} \quad (18)$$

and M and $\psi_k$ can be identified as $$M = \begin{bmatrix} \sin(\beta x_1 - \pi f \tau_1) & \sin(\beta x_1 - \pi f \tau_2) & \cdots & \sin(\beta x_1 - \pi f \tau_R) \\ \sin(\beta x_2 - \pi f \tau_1) & \sin(\beta x_2 - \pi f \tau_2) & \cdots & \sin(\beta x_2 - \pi f \tau_R) \\ \vdots & \vdots & \ddots & \vdots \\ \sin(\beta x_N - \pi f \tau_1) & \sin(\beta x_N - \pi f \tau_2) & \cdots & \sin(\beta x_N - \pi f \tau_R) \end{bmatrix} \quad (19)$$

$$\psi_k = \begin{bmatrix} A_1 \\ A_2 \\ \vdots \\ A_R \end{bmatrix} \quad (20)$$

Additive noise gets combined with $v_k$ as above. Real signals impinging on an antenna array and thus applied to the two ends of the SAW will randomly vary with time. Some of this variation will manifest itself in phase noise in the standing waves within the SAW.

This vector can also be written as $$v_k = \begin{bmatrix} b_1 \beta_1(x_1) + b_2 \beta_2(x_1) + \ldots + b_B \beta_B(x_1) \\ b_1 \beta_1(x_2) + b_2 \beta_2(x_2) + \ldots + b_B \beta_B(x_2) \\ \vdots \\ b_1 \beta_1(x_N) + b_2 \beta_2(x_N) + \ldots + b_B \beta_B(x_N) \end{bmatrix} \quad (21)$$

$$= \begin{bmatrix} \beta_1(x_1) & \beta_2(x_1) & \cdots & \beta_B(x_1) \\ \beta_1(x_2) & \beta_2(x_2) & \cdots & \beta_B(x_2) \\ \vdots & \vdots & \ddots & \vdots \\ \beta_1(x_N) & \beta_2(x_n) & \cdots & \beta_B(x_N) \end{bmatrix} \begin{bmatrix} b_1 \\ b_2 \\ \vdots \\ b_B \end{bmatrix}$$

where dim(V)=B. The $b_i$ are the coefficients representing the projection of $v_{ik}$ onto the basis vectors $\beta_i(x)$ and are unique since the set $\{\beta_i(x)\}$ is independent. The sample covariance matrix $\hat{\Gamma}$ is generated by first forming the data matrix $$Y = [v_1 \, v_2 \, \ldots \, v_F] \quad (22)$$

where F is the number of frames collected. Then $$\hat{\Gamma} = E\{YY^H\} \quad (23)$$

$$= E\left\{ [v_1 \, v_2 \, \ldots \, v_F] \begin{bmatrix} v_1^H \\ v_2^H \\ \vdots \\ v_F^H \end{bmatrix} \right\}$$

$$= E\{[v_1 v_1^H + v_2 v_2^H + \ldots + v_F v_F^H]\}$$

$$= [E\{v_1 v_1^H\} + E\{v_2 v_2^H\} + \ldots + E\{v_F v_F^H\}]$$

Consider an arbitrary element of this matrix.

$$E\{v_1 v_1^H\} = E\{(M\psi_1 + \eta_1)(M\psi_1 + \eta_1)^H\} \quad (24)$$

$$= E\{(M\psi_1 + \eta_1)(\psi_1^H M^H + \eta_1^H)\}$$

$$= E\{M\psi_1 \psi_1^H M^H + M\psi_1 \eta_1^H + \eta_1 \psi_1^H M^H + \eta_1 \eta_1^H\}$$

$$= E\{M\psi_1 \psi_1^H M^H\} + E\{M\psi_1 \eta_1^H\} + E\{\eta_1 \psi_1^H M^H\} + E\{\eta_1 \eta_1^H\}$$

$$= ME\{\psi_1 \psi_1^H\}M^H + ME\{\psi_1 \eta_1^H\} + E\{\eta_1 \psi_1^H\}M^H + E\{\eta_1 \eta_1^H\}$$

$$= MHM^H + \Phi$$

The last step follows because the signals are assumed to be uncorrelated with the noises. In this expression $$H = E\{\psi_t \psi_\rho^H\} \quad (25)$$

$$= E\left\{ \begin{bmatrix} \psi_{1_t} \\ \psi_{2_t} \\ \psi_{3_t} \\ \vdots \\ \psi_{R_t} \end{bmatrix} \begin{bmatrix} \overline{\psi}_{1_\rho} & \overline{\psi}_{2_\rho} & \overline{\psi}_{3_\rho} & \cdots & \overline{\psi}_{R_\rho} \end{bmatrix} \right\}$$

$$= E\left\{ \begin{bmatrix} \psi_{1_t} \overline{\psi}_{1_\rho} & \psi_{1_t} \overline{\psi}_{2_\rho} & \psi_{1_t} \overline{\psi}_{3_\rho} & \cdots & \psi_{1_t} \overline{\psi}_{R_\rho} \\ \psi_{2_t} \overline{\psi}_{1_\rho} & \psi_{2_t} \overline{\psi}_{2_\rho} & \psi_{2_t} \overline{\psi}_{3_\rho} & \cdots & \psi_{2_t} \overline{\psi}_{R_\rho} \\ \psi_{3_t} \overline{\psi}_{1_\rho} & \psi_{3_t} \overline{\psi}_{2_\rho} & \psi_{3_t} \overline{\psi}_{3_\rho} & \cdots & \psi_{3_t} \overline{\psi}_{R_\rho} \\ \vdots & \vdots & \vdots & \ddots & \vdots \\ \psi_{R_t} \overline{\psi}_{1_\rho} & \psi_{R_t} \overline{\psi}_{2_\rho} & \psi_{R_t} \overline{\psi}_{3_\rho} & \cdots & \psi_{R_t} \overline{\psi}_{R_\rho} \end{bmatrix} \right\}$$

and

-continued $$\Phi = E\{\eta_t \eta_\rho^H\} \quad (26)$$

$$= E\left\{\begin{bmatrix} \eta_{1_t} \\ \eta_{2_t} \\ \eta_{3_t} \\ \vdots \\ \eta_{N_{t_1}} \end{bmatrix} \begin{bmatrix} \eta_{1_\rho} & \eta_{2_\rho} & \eta_{3_\rho} & \cdots & \eta_{N_\rho} \end{bmatrix}\right\}$$

$$= E\left\{\begin{bmatrix} \eta_{1_t}\bar{\eta}_{1_\rho} & \eta_{1_t}\bar{\eta}_{2_\rho} & \eta_{1_t}\bar{\eta}_{3_\rho} & \cdots & \eta_{1_t}\bar{\eta}_{R_\rho} \\ \eta_{2_t}\bar{\eta}_{1_\rho} & \eta_{2_t}\bar{\eta}_{2_\rho} & \eta_{2_t}\bar{\eta}_{3_\rho} & \cdots & \eta_{2_t}\bar{\eta}_{R_\rho} \\ \eta_{3_t}\bar{\eta}_{1_\rho} & \eta_{3_t}\bar{\eta}_{2_\rho} & \eta_{3_t}\bar{\eta}_{3_\rho} & \cdots & \eta_{3_t}\bar{\eta}_{R_\rho} \\ \vdots & \vdots & \vdots & \ddots & \vdots \\ \eta_{N_t}\bar{\eta}_{1_\rho} & \eta_{N_t}\bar{\eta}_{2_\rho} & \eta_{N_t}\bar{\eta}_{3_\rho} & \cdots & \eta_{N_t}\bar{\eta}_{N_\rho} \end{bmatrix}\right\}$$

$$= E\begin{bmatrix} E\{\eta_{1_t}\bar{\eta}_{1_\rho}\} & & & \cdots & \\ & E\{\eta_{2_t}\bar{\eta}_{2_\rho}\} & & \cdots & \\ & & E\{\eta_{3_t}\bar{\eta}_{3_\rho}\} & \cdots & \\ \vdots & \vdots & \vdots & \ddots & \vdots \\ & & & \cdots & E\{\eta_{N_t}\bar{\eta}_{N_\rho}\} \end{bmatrix} \quad (27)$$

$$= \begin{bmatrix} \sigma^2 & & & \cdots & \\ & \sigma^2 & & \cdots & \\ & & \sigma^2 & \cdots & \\ \vdots & \vdots & \vdots & \ddots & \vdots \\ & & & \cdots & \sigma^2 \end{bmatrix} \quad (28)$$

$$= \sigma^2 I \quad (29)$$

$\hat{\Gamma}$, H and $\Phi$ are square matrices of order (N×N), (R×R) and (N×N) respectively. M and $M^H$ are of order (N×R) and (R×N) respectively.

When there is no noise, measurement errors, or other random effects, then when R is less than (N−1), the system may be over-determined and one or more linear relationships will be satisfied by the measured elements of $v_i$ on each frame and $\hat{\Gamma}$ will be of reduced rank r. It is said to have nullity (N−r). Equation (27) follows because the noises are assumed to be independent of each other so (24) assumes the asymptotic form $$\Gamma = MHM^H + \sigma^2 I \quad (30)$$

Typically, the correlation matrix $\Gamma$ is not completely known and may be estimated. A common way of estimating $\Gamma$ is to average the frame data correlations, viz, $$\hat{\Gamma} = \frac{1}{F}\sum_{i=1}^{F} v_i v_i^H = \frac{1}{F}\sum_{i=1}^{F} \begin{bmatrix} v_{1i}v_{1i}^H & v_{1i}v_{2i}^H & \cdots & v_{1i}v_{Ni}^H \\ v_{2i}v_{1i}^H & v_{2i}v_{2i}^H & \cdots & v_{2i}v_{Ni}^H \\ \vdots & \vdots & \ddots & \vdots \\ v_{Ni}v_{Ni}^H & v_{Ni}v_{2i}^H & \cdots & v_{Ni}v_{Ni}^H \end{bmatrix} \quad (31)$$

As discussed above, some embodiments may determine the time difference of arrivals of multiple signals arriving at a pair of antennas. The above discussion was a prelude establishing the basics of the processes to do just this. A few of the available techniques are discussed in this section.

An eigenvector of a square matrix G (N×N) is a non-zero column vector $e_i$ that satisfies $$Ge_i = \lambda_i e_i \quad (32)$$

for an associated scalar $\lambda_i$ known as its eigenvalue. The eigenvalues of G are found from the characteristic equation of G given by $$det[G-\lambda I]=0 \quad (33)$$

where I is the identity matrix. Matrix G has N eigenvalues, not all of which are necessarily distinct. The eigenvectors associated with any $\lambda$ form an independent set of vectors and form a basis for the linear manifold associated with $\lambda$. This linear manifold is referred to as the eigenvector manifold associated with $\lambda$. Once the eigenvectors are found, the associated eigenvectors are determined by solving (32).

When found, the eigenvalues of $\hat{\Gamma}$ fall into two groups. The first group is of larger values than the second group which, when there is no noise or measurement error, are equal to each other and are of a small value (zero). The number of larger eigenvalues is a measure of the number of constituent standing waveforms present which is equal to the number of zero crossings.

Maximum Likelihood Method

Figure 12:
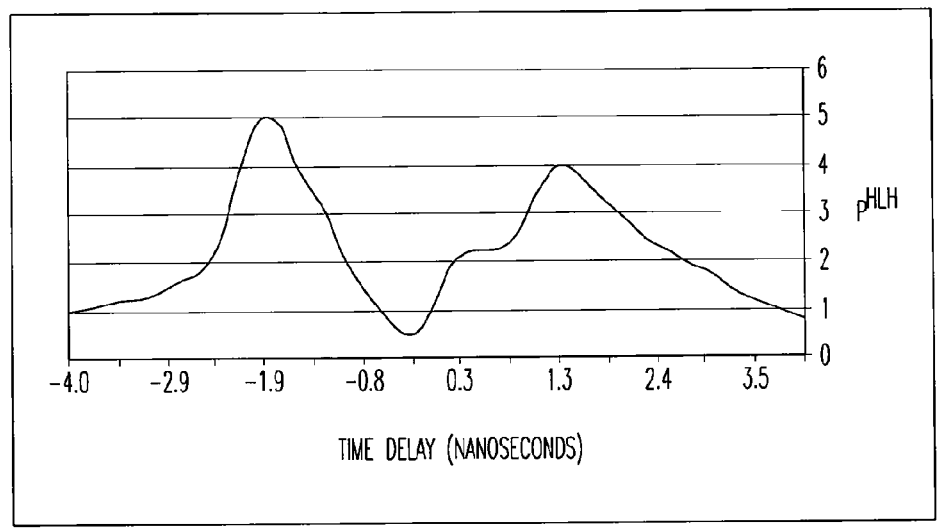

From above, when there is only a single constituent standing waveform present, then M is a column vector denoted by $\Omega$. In the maximum likelihood method, the zero crossings, and therefore the time difference of arrival of the signal at the two ends of the SAW device, can be estimated by considering each possible vector $\Omega$ and projecting $\hat{\Gamma}$ onto it. An estimate of where the zero crossings occurs wherever $\Omega^H \hat{\Gamma}^{-1} \Omega$ is minimized. Thus the functional form $$P_{ML} = \frac{1}{\Omega^H \hat{\Gamma}^{-1} \Omega} \quad (34)$$

is searched for its peaks. Such a curve might look like the one shown in FIG. 12, for example, where two constituent standing waveforms are present.

The values of $\Omega$ are determined by calibration of the SAW by injecting a signal into one end and a time-delayed version of the signal into the other. This may be done for several time delays to obtain the resolution desired. Thus, calculation (32) may be performed many times per frame, although $\hat{\Gamma}$ need only be computed once for each frame. More normally, $\hat{\Gamma}$ could be calculated and updated each frame and (32) computed only once when completed.

Once the frames of data are collected, the next step is to estimate the sample covariance matrix as the average of the frame covariance matrices $$\hat{\Gamma} = \frac{1}{F}\sum_{i=1}^{F} v_i v_i^H \quad (35)$$

where F is the number of frames collected. With the calibration data $\Omega$, compute $$P_{ML} = \frac{1}{\Omega^H \hat{\Gamma}^{-1} \Omega} \quad (36)$$

and this yields one point according to the calibration data point selected. One way to find these points on a computer is to compute $M^H \hat{\Gamma}^{-1} M$ and take the diagonal elements as $P_{ML}$.

Two signals are coherent if they share characteristics; otherwise, they are called incoherent. One cause of coherency is multipath, where one signal is a replica of another that has been reflected off a surface and arrives at the antenna array from a different direction from the direct wave.

Maximum likelihood processing is not sensitive to coherent signals like some other array processing algorithms are. The overall signal to noise ratio can be determined from the eigenvalues. With the eigenvalues sorted into those that correspond to signals and those associated with noise only, let the former set be denoted S and the latter N with dimension r. Note that there are N eigenvalues total. Then $$SNR(dB) = 10\log\left(\frac{\sum_{\lambda_i \in S}\lambda_i - \frac{r}{N-r}\sum_{\lambda_i \in N}\lambda_i}{\frac{N}{N-r}\sum_{\lambda_i \in N}\lambda_i}\right)$$

Simulation shows that for a single signal present, ML correctly finds the TDOA. When two signals are present, a waveform is generated that is similar in form to the basis functions. In fact (assuming unity amplitudes for simplicity)

$$A\sin(\beta x - \pi f\tau) = \sin(\beta x - \pi f\tau_1) + \sin(\beta x - \pi f\tau_2) = \qquad(37)$$
$$2\sin\left[\frac{1}{2}(\beta x - \pi f\tau_1 + \beta x - \pi f\tau_2)\right] \times$$
$$\cos\left[\frac{1}{2}(\beta x - \pi f\tau_1 - \beta x + \pi f\tau_2)\right] =$$
$$2\cos\left[\frac{1}{2}\pi f(\tau_2 - \tau_1)\right]\sin\left[\beta x - \pi f\frac{\tau_2 + \tau_1}{2}\right]$$

so the resultant waveform has an amplitude and equivalent time delay given by $$A = 2\cos\left[\frac{1}{2}\pi f(\tau_2 - \tau_1)\right] \qquad(38)$$

$$\tau = \frac{\tau_2 + \tau_1}{2} \qquad(39)$$

The equivalent time delay is the average of the two constituent waveforms. For R>2, similar combining occurs, although the resultant time delay is more complicated than for R=2. Therefore, maximum likelihood processing is useful for determining the time delay of a single signal with a SAW differential delay detector, but it is not useful when more than one signal is present.

The MUSIC algorithm was devised as a form of super-resolution direction finding technique for processing the signals from many antennas to obtain estimates of the angle of arrival of multiple signals. It is in a family of processes called subspace-based processing, and it is based on an eigen-decomposition of the covariance matrix derived from data samples (vectors).

In most cases of interest, the covariance matrix F is singular, as noted above, since normally R<N−1. That makes inverting this matrix for ML processing impossible in the absence of noise and measurement errors. A different technique for determining the time differences is thus recommended. One method is based on the singular value decomposition on the data matrix Y.

Singular Value Decomposition

In general Y is an m×n matrix. Any such matrix can be decomposed into $$Y = U\Sigma V^H = [U_s\ U_o]\begin{bmatrix}\Sigma_s & 0 \\ 0 & 0\end{bmatrix}\begin{bmatrix}V_s^H \\ V_o^H\end{bmatrix} \qquad(40)$$

where U is a m×n orthogonal matrix, V is a n×m orthogonal matrix and $\Sigma_s$ is a r×r diagonal matrix with real, non-negative elements, denoted by convention as $\sigma_i$, i=1, 2, ..., r=min(m, n) arranged in descending order $$\sigma_1 \geq \sigma_2 \geq \ldots \geq \sigma_r > \sigma_{r+1} = \sigma_{r+2} = \ldots = 0$$

These $\sigma_i$ are called the singular values of Y (not to be confused with the square root of the variance of the noise $\sqrt{\sigma^2}$ that has no subscript herein). The first r columns of U are the left singular vectors of Y, and the first r columns of V are the right singular vectors of Y. The structure of $\Sigma$ is $$\Sigma = \begin{bmatrix}\sigma_1 & & & & & \\ & \sigma_2 & & & 0 & \\ & & \ddots & & & \\ & & & \sigma_r & & \\ & & & & 0 & \\ & 0 & & & & \ddots \\ & & & & & & 0\end{bmatrix} = \begin{cases}\begin{bmatrix}\Sigma_s \\ 0\end{bmatrix} & \text{if } m \geq n \\ [\Sigma_s\ 0] & \text{if } m < n\end{cases} \qquad(41)$$

where r is the rank of Y. Thus $U_s$ consists of the left singular vectors associated with the non-zero singular values, and $U_o$ consists of the left singular vectors associated with the zero singular values. These $U_s$ vectors span the subspace consisting of the vectors in M. The vectors in $U_o$ span the orthogonal subspace so $$m^{<i>H}U_o = 0 \qquad(42)$$

Also, the singular vectors are normalized so that $U^H U = I$. U is the m×m matrix of orthonormalized row eigenvectors of $YY^T$ while V is the n×n matrix of orthonormalized column eigenvectors of $Y^T Y$. The singular values of Y are defined as the non-negative square roots of the eigenvalues of $YY^T$.

The singular value decomposition is perhaps most known for solutions to the least squares problem. For the linear system defined by the set of equations $$Ax = b \qquad(43)$$

where A is not square, but of dimensions m×n, and x and b are vectors, then the least squares solution is that value of x where $$\min_x \|Ax - b\| \qquad(44)$$

which is $$\hat{x} = V\Sigma^0 U^T b \qquad(45)$$

Matrix $\Sigma^0$ is $$\Sigma^0 = \begin{bmatrix} 1/\sigma_1 & & & 0 & 0 & \cdots & 0 \\ & \ddots & & & & & \\ & & 1/\sigma_r & \vdots & & \vdots & \\ & & & 0 & & & \\ & & & & \ddots & & \\ & & & 0 & 0 & \cdots & 0 \end{bmatrix} \quad (46)$$

then matrix $$A^0 = V\Sigma^0 U^T \quad (47)$$

is known as the pseudo-inverse of A. Note that if the zeros are removed from $\Sigma^0$, and U and V appropriately reduced in size, rank(A)=r, and the solution reduces to $$x = (A^T A)^{-1} A^T b \quad (48)$$

which, with $A = U\Sigma V^T$ $$x = V\Sigma^{-1} U^T b \quad (49)$$

Because Y is positive definite and Hermitian, (40) can be expressed as $$Y = U\Sigma U^H \quad (50)$$

where U is unitary. Note that if a vector x is orthogonal to $M^H$, then it is an eigenvector of F with eigenvalue $\sigma^2$ because $$\Gamma x = MH\underbrace{M^H x}_{=0} + \sigma^2 x = \sigma^2 x \quad (51)$$

The eigenvector of $\Gamma$ with eigenvalue $\sigma^2$ lies in $N(M^H)$, the null space of $M^H$. Thus the smallest (N-L) nonzero eigenvalues are $$\lambda_{L+1} = \lambda_{L+2} = \ldots \lambda_N = \sigma^2 \quad (52)$$

It is therefore possible to partition the eigenvectors into noise eigenvectors and signal eigenvectors, and the covariance matrix $\Gamma$ can be written as $$\Gamma = U_S \Sigma_S U_S^H + U_N \Sigma_N U_N^H \quad (53)$$

The range of Q is the orthogonal complement to the range of M, because $$\mathcal{R}(Q) = \mathcal{N}(M^H) = {}^\perp \mathcal{R}(M) \quad (54)$$

and therefore $$\mathcal{R}(U_S) = \mathcal{R}(M)$$

$$\mathcal{R}(U_N) = {}^\perp \mathcal{R}(M^H) \quad (55)$$

$P(U_S)$ is called the signal subspace and $P(U_N)$ is called the noise subspace. The projection operators onto these signal and noise subspaces are defined as $$P_M = MM^0 = U_S(U_S^H U_S)^{-1} U_S^H = U_S U_S^H$$

$$P_M^\perp = I - MM^0 = U_N(U_N^H U_N)^{-1} U_N^H = U_N U_N^H \quad (56)$$

Determining the TDOAs

Figure 13:
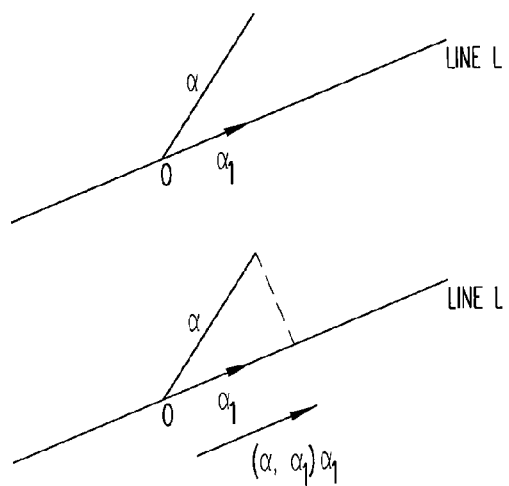

Consider the line L and vector $\alpha$ as shown in FIG. 13. Vector $\alpha_1$ is the orthonormal vector defining L. Thus $\|\alpha_1\|=1$. The magnitude of the projection of $\alpha$ onto line L is given by $(\alpha, \alpha_1)$ and its direction is specified by $\alpha_1$.

Figure 14:
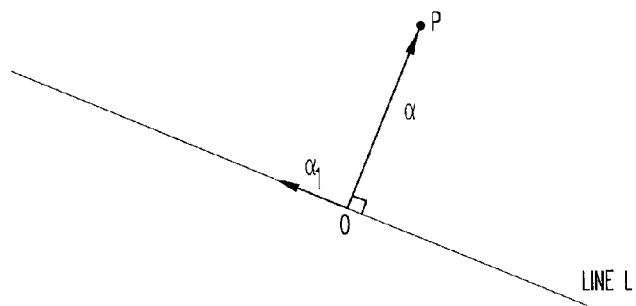

Next, consider the Euclidean vector space situation shown in FIG. 14. A point P is defined in $P^2$ by vector $\alpha$, where again $\alpha_1$ defines line L. The goal is to find the point on the line that is closest to point P. The point will be where the perpendicular (i.e., orthogonal) line drawn from the line to the point intersects with the line, the origin in this case. The inner product $(\alpha, \alpha_1)$ is zero for orthogonal vectors.

The desire here is to maximize a measure of signal to noise ratio in the processing of the tap waveforms. A waveform in the active region of the SAW has a certain SNR given by $$SNR = \frac{P_S}{P_N} \quad (57)$$

where $P_S$ is the power in the signal, and $P_N$ is the power of the noise. The simple geometric problem shown in FIG. 12 can be generalized for any Euclidean vector space and the notion can be used to find the points in an N-dimensional space that are closest to some point P.

The signals measured at each tap of the SAW define an N-dimensional space. A frame of data corresponds to one sample value from each of the N taps, and each frame then defines a point in this N-dimensional space. The statistical nature of RF signals causes one frame to be different from the next in some way. This statistical nature is due to many factors, including modulation and propagation effects in addition to noise. Several frames of data are collected for analysis. These frames form the columns of a data matrix here called Y. The standing waves existing within the active region of the SAW add due to superposition. As shown in (2), this superposition causes linear relationships for the tap signals when there is no noise or measurement error. Thus, when the number of standing waves R, one each due to each of R received signals, is less than N, it would cause the point defined by a frame to lie on hyperplanes of dimension N−1 or less. With imperfect data, the frames will not lie exactly on the hyperplanes but will be displaced from them somewhat. In that case, the goal is to search for hyperplanes that minimize the squared error vectors from the measured frame data to the hyperplanes, and such vectors are perpendicular to the hyperplanes. The line in FIG. 14 may be replaced with a set of basis functions of the vector space, and the point is a frame of data. The problem becomes one of minimizing mean squared error as described above. These hyperplanes may be determined using the singular value decomposition described above since it is useful for solving problems that are cast in a least squares setting.

Figure 15:
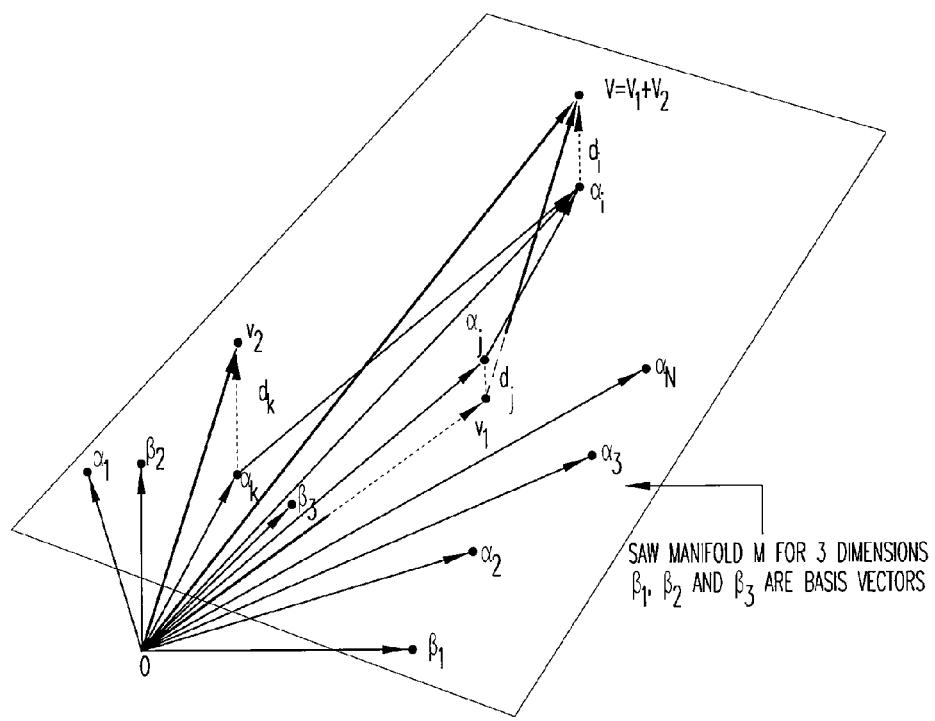

In three dimensions, these planes look like the plane shown in FIG. 15. The vectors are denoted by $\alpha$, whereas the measured vectors are denoted by v. The distances to be minimized by selecting the appropriate set of $\alpha$ are denoted by $d_i$.

Alternately, the eigenstructure of the covariance matrix $\Gamma$ can be analyzed to determine the time differences of arrival. However, the normal nonsingular nature of $\Gamma$ can cause numerical problems in some cases. In this technique, the N-dimensional space is partitioned into a signal subspace and an orthogonal noise subspace. The computation approach, starting from the covariance matrix estimate $\hat{\Gamma}$, uses the determination of the eigenvalues and eigenvectors of this matrix. As previously mentioned, the eigenvalues of $\Gamma$ form two sets, one consisting of larger eigenvalues than the other. Starting with k=0, and going until k=N, where k is the estimated number of eigenvalues, a logical dividing point is selected for the number of signals present. The eigenvectors corresponding to the signal subspace eigenvalues in the larger set (larger in value, not cardinality), denoted $R_S$, span the signal space while the eigenvectors corresponding to the smaller, denoted $R_N$, set span the orthogonal noise subspace.

The matrix $R_N$ of eigenvectors spanning the noise subspace is used to calculate the function $$P_{MUSIC} = \frac{1}{\Omega^H R_N R_N^H \Omega} \equiv \frac{1}{f(\tau)} \qquad (58)$$

Figure 16:
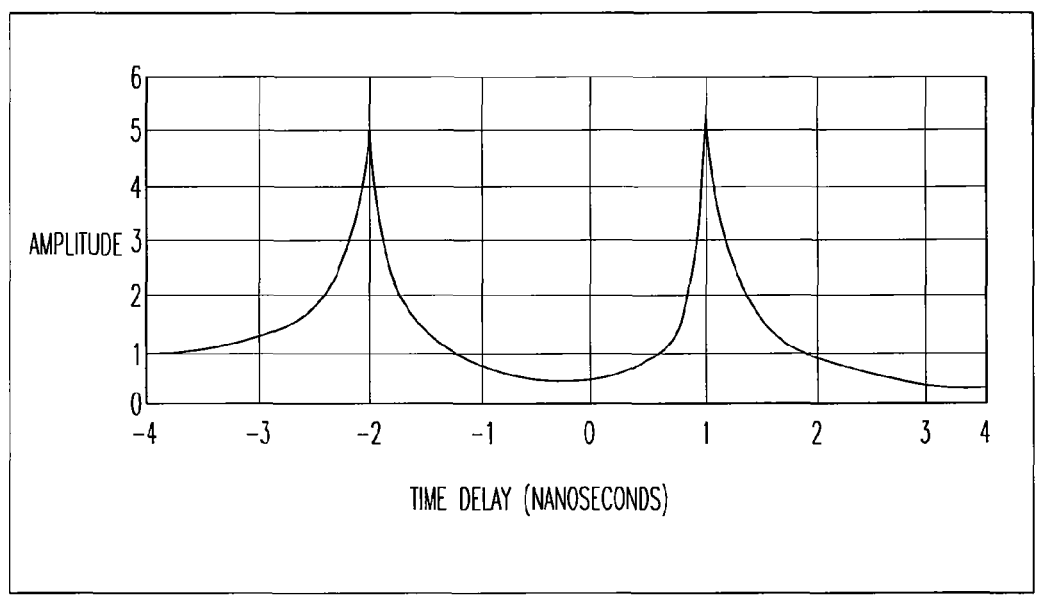

As with the ML method, the peaks in this function are determined, and the R highest peaks are an estimate of where the time differences occur. The plot shown in FIG. 16 might be representative of such a curve.

The MUSIC technique for spectral estimation is sensitive to fully coherent signals, since then the covariance matrix is singular. Performance of the algorithm then depends on the degree of coherency in the signals.

Another way to consider this algorithm is as follows. Suppose there are R signals impinging on the antennas, and therefore R constituent standing waves present in the SAW. Now M($\tau$) is projected onto the noise subspace P($U_N$). The projection gives the vector $$z = P_M^\perp M(\tau) \qquad (59)$$

The magnitude squared of z can be written as $$f(\tau) = z^H z = M^H(\tau)(P_M^\perp)^H P_M^\perp M(\tau) = M^H(\tau) U_N U_N^H M(\tau) \qquad (60)$$

Obviously $f(\tau)=0$ if $\tau \in \{\tau_1, \tau_2, \ldots, \tau_R\}$. Therefore, $f(\tau_k)$ is evaluated for all $\tau_k$ and where $f(\tau_k)=0$ are those values of $\tau$ selected as the TDOA estimates.

The Abstract is provided to comply with 37 C.F.R. Section 1.72(b requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A receiving station configured to determine a location of a transmitting device based on reception of short-duration frequency-hopping spread spectrum (FHSS) signals having a duration of as short as ten microseconds, the receiving station comprising:
   first, second and third antennas;
   switching circuitry coupled to the antennas and configured to select pairs of the antennas;
   a surface acoustic wave (SAW) delay line having first and second opposite ends and a plurality of tap outputs;
   receiver circuitry coupled to outputs of the switching circuitry configured to receive the FHSS signals transmitted by the transmitting device through a selected pair of the antennas, the receiver circuitry configured to hop to particular frequencies based on a known spreading sequence to receive the FHSS signals;
   processing circuitry arranged to cause the switching circuitry to select the pairs of the antennas and configured to process signals present at the tap outputs to determine a time-difference-of-arrival (TDOA) between the FHSS signals received through the selected pair of antennas; and
   an inverter coupled between the receiver circuitry and the SAW delay line configured to provide an inverted version of signals received through a second antenna of the selected pair to the second opposite end of the SAW delay line,
   wherein the receiver circuitry is further configured to inject a non-inverted version of the FHSS signals received through a first antenna of the selected pair into the first opposite end of the SAW delay line and to inject the inverted version of the FHSS signals received through the second antenna of the selected pair into the second opposite end of the SAW delay line to set up an acoustic standing-wave within the SAW delay line,
   wherein the processing circuitry is further configured to determine the TDOA for each selected pair of antennas by detection of a zero-crossing of the standing wave,
   wherein the processing circuitry is further configured to provide the TDOAs determined for each selected pair of antennas for use in determining an angle-of-arrival (AOA) of the signals from the transmitting device, and
   wherein the processing circuitry is further configured to cause the switching circuitry to reverse polarity of the received FHSS signals wherein the non-inverted version of the FHSS signals received through the first antenna of the selected pair is injected into the second opposite end of the SAW delay line and the inverted version of the FHSS signals received through the second antenna of the selected pair is injected into the first opposite end of the SAW delay line.

2. The receiving station of claim 1, wherein the pair of antennas is a first pair of antennas,
   wherein the processing circuitry is configured to cause the receiving station to select a second pair of antennas for receipt of the FHSS signals from the transmitting device,
   wherein the receiver circuitry is configured to inject a non-inverted version of the FHSS signals received through one antenna of the second pair into the first opposite end of the SAW delay line and to inject an inverted version of the FHSS signals received through a second antenna of the second pair into the second opposite end of the SAW delay line; and
   wherein the processing circuitry is further configured to process signals present at the tap outputs to determine a TDOA between the FHSS signals received through the antennas of the second pair.

3. The receiving station of claim 2, wherein for each selected pair of antennas, the processing circuitry is configured to process the signals present at the tap outputs with a processing algorithm to determine the TDOA between the FHSS signals received through the selected pair of antennas.

4. The receiving station of claim 3, wherein the TDOA between the FHSS signals received through the first pair of antennas, and the TDOA between the FHSS signals received through the second pair of antennas, is used to determine an angle-of-arrival (AOA) of the signals; and
   wherein the AOA indicates a direction from the receiving station to the transmitting device.

5. The receiving station of claim 3, wherein the switching circuitry is configurable to select a pair of antennas from the plurality of antennas to allow the processor to determine the TDOA between FHSS signals received by the selected pair of antennas.

6. The receiving station of claim 3,
   wherein for each selected pair of antennas,
   the FHSS signals injected into the opposite ends of the SAW delay line set up the standing wave within the SAW delay line; and
   the processing circuitry is configured to:
   detect the zero-crossing of the standing wave based on amplitudes of the signals present at the tap outputs, a location of the zero-crossing occurring within the SAW device either between two adjacent tap outputs or at one of the tap outputs; and determine the TDOA based on a time delay associated with the location of the zero-crossing within the SAW device.

7. A receiving station configured to determine a location of a transmitting device based on reception of short-duration frequency-hopping spread spectrum (FHSS) signals having a duration of as short as ten microseconds, the receiving station comprising:
   a surface acoustic wave (SAW) delay line having first and second opposite ends and a plurality of tap outputs;
   receiver circuitry configured to receive the FHSS signals transmitted by the transmitting device through a pair of antennas of a plurality of spatially-diverse antennas, the receiver circuitry configured to hop to particular frequencies based on a known spreading sequence to receive the FHSS signals; and
   processing circuitry configured to process signals present at the tap outputs to determine a time-difference-of-arrival (TDOA) between the signals received through the pair of antennas,
   wherein the receiver circuitry is configured to inject a non-inverted version of the FHSS signals received through a first antenna of the pair into the first opposite end of the SAW delay line and to inject an inverted version of the FHSS signals received through a second antenna of the pair into the second opposite end of the SAW delay line to set up a standing-wave within the SAW delay line,
   wherein the receiving station comprises an inverter configured to generate the inverted version of the FHSS signals received through the second antenna for injection into the second opposite end of the SAW delay line,
   wherein the processing circuitry is configured to detect a zero-crossing of the standing wave to determine the TDOA,
   wherein the pair of antennas is a first pair of antennas,
   wherein the processing circuitry is configured to cause the receiving station to select a second pair of antennas for receipt of the FHSS signals from the transmitting device,
   wherein the receiver circuitry is configured to inject a non-inverted version of the FHSS signals received through one antenna of the second pair into the first opposite end of the SAW delay line and to inject an inverted version of the FHSS signals received through a second antenna of the second pair into the second opposite end of the SAW delay line;
   wherein the processing circuitry is further configured to process signals present at the tap outputs to determine a TDOA between the FHSS signals received through the antennas of the second pair,
   wherein the receiving circuitry comprises:
   a receiver associated with each of the antennas; and
   a plurality of SAW delay lines, each SAW delay line being associated with a different pair of the antennas,
   wherein the receivers are configured to inject a non-inverted version of the FHSS signals received from the transmitting device into an input of one of the SAW delay lines and inject an inverted version of the FHSS signals received from the transmitting device into an input of another SAW delay line; and
   wherein the processing circuitry is configured to process signals present at the tap outputs of at least two of the SAW delay lines to determine a TDOA between the FHSS signals received by the at least two pairs of the antennas, and
   wherein the processing circuitry is further configured to cause the switching circuitry to reverse polarity of the received FHSS signals wherein the non-inverted version of the FHSS signals received through the first antenna of the selected pair is injected into the second opposite end of the SAW delay line and the inverted version of the FHSS signals received through the second antenna of the selected pair is injected into the first opposite end of the SAW delay line.

8. A receiving station comprising:
   a surface acoustic wave (SAW) delay line having first and second opposite ends and a plurality of tap outputs;
   receiver circuitry configured to receive signals transmitted by a transmitting device through a pair of antennas of a plurality of spatially-diverse antennas; and
   processing circuitry configured to process signals present at the tap outputs to determine a time-difference-of-arrival (TDOA) between the signals received through the pair of antennas,
   wherein the receiver circuitry is configured to inject a non-inverted version of the signals received through a first antenna of the pair into the first opposite end of the SAW delay line and to inject an inverted version of the signals received through a second antenna of the pair into the second opposite end of the SAW delay line to set up a standing-wave within the SAW delay line,
   wherein the receiving station comprises an inverter configured to generate the inverted version of the signals received through the second antenna for injection into the second opposite end of the SAW delay line,
   wherein the processing circuitry is configured to detect a zero-crossing of the standing wave to determine the TDOA,
   wherein the signals present at the tap outputs comprise tap-output vectors, each tap-output vector corresponding to a frame of data,
   wherein the processing circuitry is configured to process each tap-output vector by:
   sampling the tap-output vector present at tap outputs and converting the sampled tap-output vector to a digital form to generate digitized tap-output vectors;
   determining an estimated sample covariance matrix from the digitized tap-output vectors;
   performing a singular-value decomposition (SVD) of the estimated sample covariance matrix;
   generating eigenvectors from the SVD;
   partitioning the eigenvectors into noise and signal eigenvectors; and
   determining the TDOA from the signal eigenvectors.

9. A location-determining system for determining a location of a transmitting device based on reception of short-duration frequency-hopping spread spectrum (FHSS) signals having a duration of as short as ten microseconds, the system comprising:
   a plurality of receiving stations, each receiving station configured to determine an angle-of-arrival (AOA) of the FHSS signals transmitted from the transmitting device; and
   location-determining circuitry configured to determine the location of the transmitting device from each of the AOAs,
   wherein each receiving station comprises:
   first, second and third antennas;
   switching circuitry coupled to the antennas and configured to select pairs of the antennas;
   a surface acoustic wave (SAW) delay line having first and second opposite ends and a plurality of tap outputs;
   receiver circuitry coupled to outputs of the switching circuitry configured to receive the FHSS signals transmitted by the transmitting device through pairs of the antennas for injection into the first and second opposite ends to set up a standing wave in the SAW delay line, the receiver circuitry configured to hop to particular frequencies based on a known spreading sequence to receive the FHSS signals; and processing circuitry arranged to cause the switching circuitry to the select pairs of the antennas and configured to process signals present at the tap outputs to determine a time-difference-of-arrival (TDOA) between the the FHSS signals received through the antennas of two or more pairs for use in determining the AOA, wherein each receiving station comprises an inverter coupled between the receiver circuitry and the SAW delay line configured to generate an inverted version of the FHSS signals received through a second of the antennas for injection into the second opposite end of the SAW delay line, and wherein the processing circuitry is configured to detect a zero-crossing of the standing wave to determine the TDOA, and wherein the processing circuitry is further configured to cause the switching circuitry to reverse polarity of the received FHSS signals wherein the non-inverted version of the FHSS signals received through the first antenna of the selected pair is injected into the second opposite end of the SAW delay line and the inverted version of the FHSS signals received through the second antenna of the selected pair is injected into the first opposite end of the SAW delay line.

10. The system of claim 9, wherein the receiver circuitry of each receiving station is configured to inject a non-inverted version of the FHSS signals received through a first antenna of a selected pair into the first opposite end of the SAW delay line and to inject an inverted version of the signals received through a second antenna of the selected pair into second opposite end of the SAW delay line; and wherein the processing circuitry is configured to determine the AOA based on the TDOA determined for each pair of antennas.

11. The system of claim 10, wherein for each pair of antennas, the processing circuitry is configured to process the signals present at the tap outputs with a subspace processing algorithm to determine the TDOA between the between the FHSS signals received through the selected pair of antennas.

12. The system of claim 11
wherein the first and second opposite ends of the SAW delay line are on opposite ends of the SAW delay line and allow the non-inverted and inverted versions of the FHSS signals to propagate through the SAW delay line to set up the standing wave in the SAW delay line.

13. The system of claim 12 wherein the processing circuitry is configured to:
detect the zero-crossing of the standing wave based on amplitudes of the signals present at the tap outputs, a location of the zero-crossing occurring within the SAW device either between two adjacent tap outputs or at one of the tap outputs; and
determine the TDOA based on a time delay associated with the location of the zero-crossing within the SAW device.

* * * * *

UNITED STATES PATENT AND TRADEMARK OFFICE
CERTIFICATE OF CORRECTION

PATENT NO. : 8,884,820 B2
APPLICATION NO. : 12/820697
DATED : November 11, 2014
INVENTOR(S) : Richard A. Poisel Page 1 of 3

It is certified that error appears in the above-identified patent and that said Letters Patent is hereby corrected as shown below:

In the specification

In column 8, line 43 (Approx.), delete "
$$x = \frac{1}{\beta}\tan^{-1}\left[\frac{\sum_{i=1}^{R} A_1 \sin(\pi f \tau_i)}{\sum_{i=1}^{R} A_i \cos(\pi f \tau_i)}\right]$$
"

and insert --
$$x = \frac{1}{\beta}\tan^{-1}\left[\frac{\sum_{i=1}^{R} A_1 \sin(\pi f \tau_i)}{\sum_{i=1}^{R} A_i \cos(\pi f \tau_i)}\right]$$
--, therefor In column 9, line 4, after "versus" insert --$\tau_j$.--, therefor Signed and Sealed this
Ninth Day of August, 2016

Michelle K. Lee
*Director of the United States Patent and Trademark Office*

In column 11, line 60-63 (Approx.), (Equation 21), delete

"$$= \begin{bmatrix} \beta_1(x_1) & \beta_2(x_1) & \ldots & \beta_B(x_1) \\ \beta_1(x_2) & \beta_2(x_2) & \ldots & \beta_B(x_2) \\ \vdots & \vdots & \ddots & \vdots \\ \beta_1(x_N) & \beta_2(x_n) & \ldots & \beta_B(x_N) \end{bmatrix} \begin{bmatrix} b_1 \\ b_2 \\ \vdots \\ b_B \end{bmatrix}$$"

and insert --

$$= \begin{bmatrix} \beta_1(x_1) & \beta_2(x_1) & \ldots & \beta_B(x_1) \\ \beta_1(x_2) & \beta_2(x_2) & \ldots & \beta_B(x_2) \\ \vdots & \vdots & \ddots & \vdots \\ \beta_1(x_N) & \beta_2(x_n) & \ldots & \beta_B(x_N) \end{bmatrix} \begin{bmatrix} b_1 \\ b_2 \\ \vdots \\ b_B \end{bmatrix}$$

--, therefor

In column 13, line 10-15 (Approx.), (Equation 26), delete

"$$= E\left\{ \begin{bmatrix} \eta_{1_t}\bar{\eta}_{1_\rho} & \eta_{1_t}\bar{\eta}_{2_\rho} & \eta_{1_t}\bar{\eta}_{3_\rho} & \ldots & \eta_{1_t}\bar{\eta}_{R_\rho} \\ \eta_{2_t}\bar{\eta}_{1_\rho} & \eta_{2_t}\bar{\eta}_{2_\rho} & \eta_{2_t}\bar{\eta}_{3_\rho} & \ldots & \eta_{2_t}\bar{\eta}_{R_\rho} \\ \eta_{3_t}\bar{\eta}_{1_\rho} & \eta_{3_t}\bar{\eta}_{2_\rho} & \eta_{3_t}\bar{\eta}_{3_\rho} & \ldots & \eta_{3_t}\bar{\eta}_{R_\rho} \\ \vdots & \vdots & \vdots & \ddots & \vdots \\ \eta_{N_t}\bar{\eta}_{1_\rho} & \eta_{N_t}\bar{\eta}_{2_\rho} & \eta_{N_t}\bar{\eta}_{3_\rho} & \ldots & \eta_{N_t}\bar{\eta}_{N_\rho} \end{bmatrix} \right\}$$"

CERTIFICATE OF CORRECTION (continued)

U.S. Pat. No. 8,884,820 B2 and insert --
$$= E\left\{\begin{bmatrix} \eta_{1_t}\bar{\eta}_{1_\rho} & \eta_{1_t}\bar{\eta}_{2_\rho} & \eta_{1_t}\bar{\eta}_{3_\rho} & \cdots & \eta_{1_t}\bar{\eta}_{R_\rho} \\ \eta_{2_t}\bar{\eta}_{1_\rho} & \eta_{2_t}\bar{\eta}_{2_\rho} & \eta_{2_t}\bar{\eta}_{3_\rho} & \cdots & \eta_{2_t}\bar{\eta}_{R_\rho} \\ \eta_{3_t}\bar{\eta}_{1_\rho} & \eta_{3_t}\bar{\eta}_{2_\rho} & \eta_{3_t}\bar{\eta}_{3_\rho} & \cdots & \eta_{3_t}\bar{\eta}_{R_\rho} \\ \vdots & \vdots & \vdots & \ddots & \vdots \\ \eta_{N_t}\bar{\eta}_{1_\rho} & \eta_{N_t}\bar{\eta}_{2_\rho} & \eta_{N_t}\bar{\eta}_{3_\rho} & \cdots & \eta_{N_t}\bar{\eta}_{N_\rho} \end{bmatrix}\right\}$$
--, therefor In column 17, line 27, delete "F" and insert --$\Gamma$--, therefor In the claims In column 24, line 12, in Claim 11, after "TDOA", delete "between the", therefor